United States Patent US 9,274,686 B2
Armitage
Mar. 1, 2016

(54) NAVIGATION FRAMEWORK FOR VISUAL ANALYTIC DISPLAYS

(71) Applicant: SAP AG, Walldorf (DE)

(72) Inventor: John Armitage, Berkeley, CA (US)

(73) Assignee: SAP SE, Walldorf (DE)

( * ) Notice: Subject to any disclaimer, the term of this patent is extended or adjusted under 35 U.S.C. 154(b) by 247 days.

(21) Appl. No.: 13/890,998

(22) Filed: May 9, 2013

(65) Prior Publication Data

US 2014/0337778 A1 Nov. 13, 2014

(51) Int. Cl.
G06F 3/048 (2013.01)
G06F 3/0484 (2013.01)
G06F 1/16 (2006.01)

(52) U.S. Cl.
CPC ............ *G06F 3/0484* (2013.01); *G06F 1/1694* (2013.01); *G06F 2200/1637* (2013.01); *G06F 2203/04803* (2013.01)

(58) Field of Classification Search
CPC ... G06F 3/0481; G06F 3/0482; G06F 3/0485; G06F 3/04817; G06F 3/017; G06F 17/30873; G06F 17/30991; G06F 17/30572; G06F 17/30592; G06F 17/30994; G06F 2216/15
See application file for complete search history.

(56) References Cited

U.S. PATENT DOCUMENTS

| | | | |
|---|---|---|---|
| 2008/0174570 A1* | 7/2008 | Jobs et al. | 345/173 |
| 2009/0303676 A1* | 12/2009 | Behar et al. | 361/679.27 |
| 2011/0249003 A1* | 10/2011 | Mercuri | 345/440 |
| 2012/0017147 A1* | 1/2012 | Mark | 715/702 |
| 2013/0151987 A1* | 6/2013 | Flynn et al. | 715/753 |

\* cited by examiner

*Primary Examiner* — Claudia Dragoescu

(74) *Attorney, Agent, or Firm* — Fountainhead Law Group PC

(57) ABSTRACT

Systems and methods for model based creation and editing of visual analytic dashboards are disclosed. A dashboard manager receives a dashboard model that defines the specification of a particular dashboard. In particular, the dashboard model can include description of the visual analytics to be rendered in the dashboard. The dashboard model can also include a description of the arrangement of the visual analytics. The dashboard models are compatible with a user interface framework that includes default or standardized navigation patterns for organizing and navigating among and within dashboards. The navigation pattern can include the specification of a number of separate horizontally navigable channels sections into which the visual analytics are groups by type. A title section can also be included with controls for horizontally navigating between multiple dashboard and panels.

18 Claims, 27 Drawing Sheets

(12)  US 9,274,686 B2

NAVIGATION FRAMEWORK FOR VISUAL ANALYTIC DISPLAYS

BACKGROUND

The present disclosure relates to visual analytics, and in particular, to a graphical user interface implemented as a dashboard with a navigation framework for displaying and interacting with visual analytics.

Unless otherwise indicated herein, the approaches described in this section are not prior art to the claims in this application and are not admitted to be prior art by inclusion in this section.

Many users consume data for various use and business cases in the form of visual analytics organized in what are known as "dashboards". The information displayed in a dashboard typically includes collections of visual analytics and other data arranged and displayed in a specific manner. The manner in which the information is displayed can be designed with work and information flows to serve a particular audience and/or purpose. FIG. 1 depicts an example dashboard 100 that includes a number of visual analytics 110 laid out in a particular manner. Dashboard 100 may also include a number of controls 120 for navigating among or interacting with the visual analytics 110. The particular contents of the visual analytics 110 and the layout of the visual analytics within dashboard 100 may have been designed specifically for a particular user, group of users, or business use case. For example, a manager of a sales team may want to see a number of visual analytics regarding the performance of the sales team. The manager's dashboard may be customized to show a collection of summary analytics that quickly convey information about the sales team's performance, like aggregate or total sales, sales trends, sales forecast, regional sale performance, etc. The sales manger's dashboard may also include a customized set of controls specifically designed to allow the manger to explore the information contained in the summary visual analytics in an organized and meaningful way that can help the manager efficiently consume, understand, and use the information included in the visual analytics.

However dashboards, like dashboard 100 and the sale manager's dashboard, are typically custom designed by highly trained information technology (IT) personnel who have in-depth institutional or industry knowledge of various data and work flows, as well as the necessary expertise using sophisticated dashboard editing tools. Most non-technical users, like typical business users, do not have the necessary skills or technical knowledge to easily design, let alone construct, an effective dashboard for themselves or others using conventional dashboard creation tools. Accordingly, the initial deployment, maintenance and update of dashboards or visual analytics are often an expensive and time-consuming endeavor.

Embodiments of the present disclosure simplify the process of designing and creating customized dashboards by providing a system and method for laying out dashboards in a way that standardizes navigation within and among dashboards that accommodates a wide variety of visual analytic types and business use cases.

SUMMARY

Embodiments of the present disclosure improve the creation, display, and navigation of dashboards of visual analytics. In one embodiment the present disclosure includes a method comprising: loading, in a portable computing device, a graphical user interface (GUI) framework, wherein the GUI framework comprises, a navigable title section, and a plurality of panels corresponding to a plurality of particular purposes. The navigable title section may include controls for navigating among the plurality of panels, and each of the plurality of panels can include a plurality of separate horizontally navigable channel sections. The method may also include receiving a plurality of visual analytics, and loading a set of visual analytics selected from the plurality of visual analytics into the plurality of separate horizontally navigable channels of the plurality of panels.

In some embodiments the method may further include receiving, in the portable computing device, a dashboard model. The dashboard model defines the set of visual analytics and an arrangement of the set of visual analytics, the arrangement being compatible with the GUI framework, and wherein loading the set of visual analytics also includes loading the set of visual analytics into the plurality of panels according to the arrangement.

In one embodiment, the method includes receiving a user input through the controls of the navigable title section, and rendering, in response to the user input, at least one panel in the plurality of panels.

In one embodiment, rendering the at least one panel in the plurality of panels comprises first rendering a first panel in the plurality of panels and then rendering a second panel in the plurality of panels.

In one embodiment, the method further includes receiving a user input through a motion sensor of the portable computing device and, in response thereto, rendering a secondary representation of at least one of the plurality of visual analytics.

In one embodiment, the method includes generating, in the portable computing device, a main panel comprising a subset of the set of visual analytics, wherein each of the subset represents a particular panel in the plurality of panels and comprises controls to navigate to the particular panel.

In one embodiment, the method also includes, receiving user input through the controls of one of the subset, and in response thereto, rendering the particular panel.

Another embodiment includes a non-transitory computer readable medium storing instructions that when executed by a computer processor cause the computer processor to be configured for, loading a graphical user interface (GUI) framework, wherein the GUI framework includes a navigable title section and a plurality of panels corresponding to a plurality of particular purposes. The navigable title section may include controls for navigating among the plurality of panels, and wherein each of the plurality of panels comprises a plurality of separate horizontally navigable channels. Such embodiments may also include receiving a plurality of visual analytics, and loading a set of visual analytics selected from the plurality of visual analytics into the plurality of separate horizontally navigable channels of the plurality of panels.

In one embodiment, the instructions of the non-transitory computer readable medium further cause the computer processor to be configured for receiving a dashboard model, wherein the dashboard model defines the set of visual analytics and an arrangement of the set of visual analytics, the arrangement being compatible with the GUI framework. Loading the set of visual analytics may include loading the set of visual analytics into the plurality of panels according to the arrangement.

In one embodiment, the instructions further cause the computer processor to be configured for receiving a user input through the controls of the navigable title section, and rendering, in response to the user input, at least one panel in the plurality of panels.

In one embodiment, rendering the at least one panel in the plurality of panels comprises first rendering a first panel in the plurality of panels and then rendering a second panel in the plurality of panels.

In one embodiment, the instructions further cause the computer processor to be configured for receiving a user input through a motion sensor of the portable computing device and, in response thereto, rendering a secondary representation of at least one of the plurality of visual analytics.

In one embodiment, the instructions further cause the computer processor to be configured for generating a main panel comprising a subset of the set of visual analytics, wherein each of the subset represents a particular panel in the plurality of panels and comprises controls to navigate to the particular panel.

Other embodiment includes a portable computing device having a processor, a display device coupled to the processor, a motion sensor coupled to the processor, a non-transitory computer readable medium comprising instructions that when executed by the processor cause the computer processor to be configured to load a graphical user interface (GUI) framework. The GUI framework may include a navigable title section, and a plurality of panels corresponding to a plurality of particular purposes, wherein the navigable title section comprises controls for navigating among the plurality of panels, and wherein each of the plurality of panels comprises a plurality of separate horizontally navigable channels. The instructions may also cause the computer processor to receive a plurality of visual analytics and load a set of visual analytics selected from the plurality of visual analytics into the plurality of separate horizontally navigable channels of the plurality of panels.

In one embodiment, the non-transitory computer readable medium further comprises instructions that cause the computer processor to be configured to receive a dashboard model, wherein the dashboard model defines the set of visual analytics and an arrangement of the set of visual analytics, the arrangement being compatible with the GUI framework. The instructions further cause the processor to be configured to load the set of visual analytics may further cause the processor to be configured to load the set of visual analytics into the plurality of panels according to the arrangement.

In one embodiment, the instructions may further cause the processor to be configured to receive a user input through the controls of the navigable title section, and display in the display device, in response to the user input, at least one panel in the plurality of panels.

In one embodiment, the instructions further cause the processor to be configured display at least one panel in the plurality of panels further comprises instructions that cause the processor to be configured to first render a first panel in the plurality of panels and then render a second panel in the plurality of panels.

In one embodiment, the instructions further cause the processor to be configured to receive a user input through the motion sensor of the portable computing device and, in response thereto, render a secondary representation of at least one of the plurality of visual analytics.

In one embodiment, the instructions further cause the processor to be configured to generate a main panel comprising a subset of the set of visual analytics, wherein each of the subset represents a particular panel in the plurality of panels and comprises controls to navigate to the particular panel.

The following detailed description and accompanying drawings provide a better understanding of the nature and advantages of the present invention.

DETAILED DESCRIPTION

Figure 1:
FIG. 1 illustrates a dashboard according to an embodiment.

Described herein are techniques for systems and methods for a navigation framework for visual analytic dashboards. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Overview

Embodiments of the present disclosure include systems and methods for a navigation framework for dashboards that simplify the design, creation, and maintenance of a collection of visual analytics. The navigation framework may include and/or use standardized or predetermined dashboard models that may be used for selecting and organizing visual analytics into a dashboard customized for a particular user or purpose. A dashboard model may include a detailed description of the visual analytics to be included in the dashboard, the source of the visual analytics or analytic data, the arrangement of the visual analytics relative to one another within the dashboard, and the type and placements of controls for navigating within and among various components of the dashboard. In some embodiments, the dashboard, and the corresponding dashboard model, may be edited to add, remove, and rearrange the visual analytics within the dashboard at design time or at run time. Accordingly, dashboard designers and end users alike can easily customize dashboards of visual analytics.

One particular advantage of the dashboard model is that it can be used both at design time and at run time. At design time, a default dashboard model can be loaded into a graphical user interface (GUI) framework and instantiated as an empty dashboard or a dashboard partially populated with specified visual analytics. The GUI framework may include a system, implemented as a combination of hardware and software, for providing the backend functionality of the dashboard. For instance, the GUI framework may include a dashboard manager or composer for coordinating the interaction between a dashboard, a user, and one or more providers of analytics or analytic data. The dashboard manager can retrieve and load the dashboard model, instantiate it as a dashboard, and then populate the dashboard with various types of visual analytics according to the arrangement and navigation controls defined in the dashboard model. The dashboard manager can then receive user input to make changes to the dashboard. The content, layout, and navigation scheme of the resulting dashboard can thus be easily customized to quickly and efficiently allow a user to consume, understand, and use the underlying data represented by the visual analytics in dashboard. At run time, the dashboard manager can load a predetermined or previously created dashboard model to render a dashboard having specific visual analytics and navigation flows. Using predetermined or previously created dashboard models allow for fast and efficient deployment of a particular dashboard to multiple users. To customize or personalize individual instances of a particular dashboard model, dashboard may include controls defined in the dashboard model that allow a user to make custom changes to the dashboard which can then be saved as new or updated dashboard model.

Embodiments of the present disclosure include dashboard models specifically designed to generate dashboard intended for use in portable computing devices, such as smart phones, tablet computers, and other computing devices that include motion sensors and/or touch sensitive user interfaces and displays. In particular, a dashboard model specifically developed for use with portable computing devices can include specifications for a layout and navigation framework that can accommodate a wide variety of visual analytic types suited to the display capabilities of the device (e.g., display size and resolution) and include a default navigation pattern adapted to the controls and sensors of the device (e.g., gesture sensitive touchscreens and motion sensors) to support a wide variety of business use cases.

Dashboard models may include specifications for controls that are specifically adapted to a touchscreen input device that allows a user to quickly and efficiently navigate through the visual analytics by swiping, tapping, or otherwise gesturing on the touchscreen using fingers or styli. In addition, the dashboard model can include specifications for controls that can be activated by input received from a motion sensor, such as an inertial or gyroscopic sensor, that can determine the physical motion or orientation of a portable computing device. For example, upon a change in orientation, i.e. from portrait mode to landscape mode, the configuration, view, or perspective of a particular active dashboard can also change. In one embodiment, in addition to changing the orientation of the text on the display device, the level of detail of a particular active visual analytic may also change. For example, the view of the dashboard may zoom in from a high-level view of one or more visual analytics to a more detailed view of a particular visual analytic. The particular visual analytic may correspond to a selected or active visual analytic at the time the orientation change or other user input is determined.

By providing standardized layout and navigation tools, embodiments of the present disclosure obviate the need for IT professionals to devise new or unique layouts and navigation hierarchies for each new dashboard. Instead, non-technical users can develop their own dashboards by adopting the standardized layout and populating the dashboard with a selection of visual analytics.

System for Creating, Initiating, and Displaying Dashboards

Figure 2:
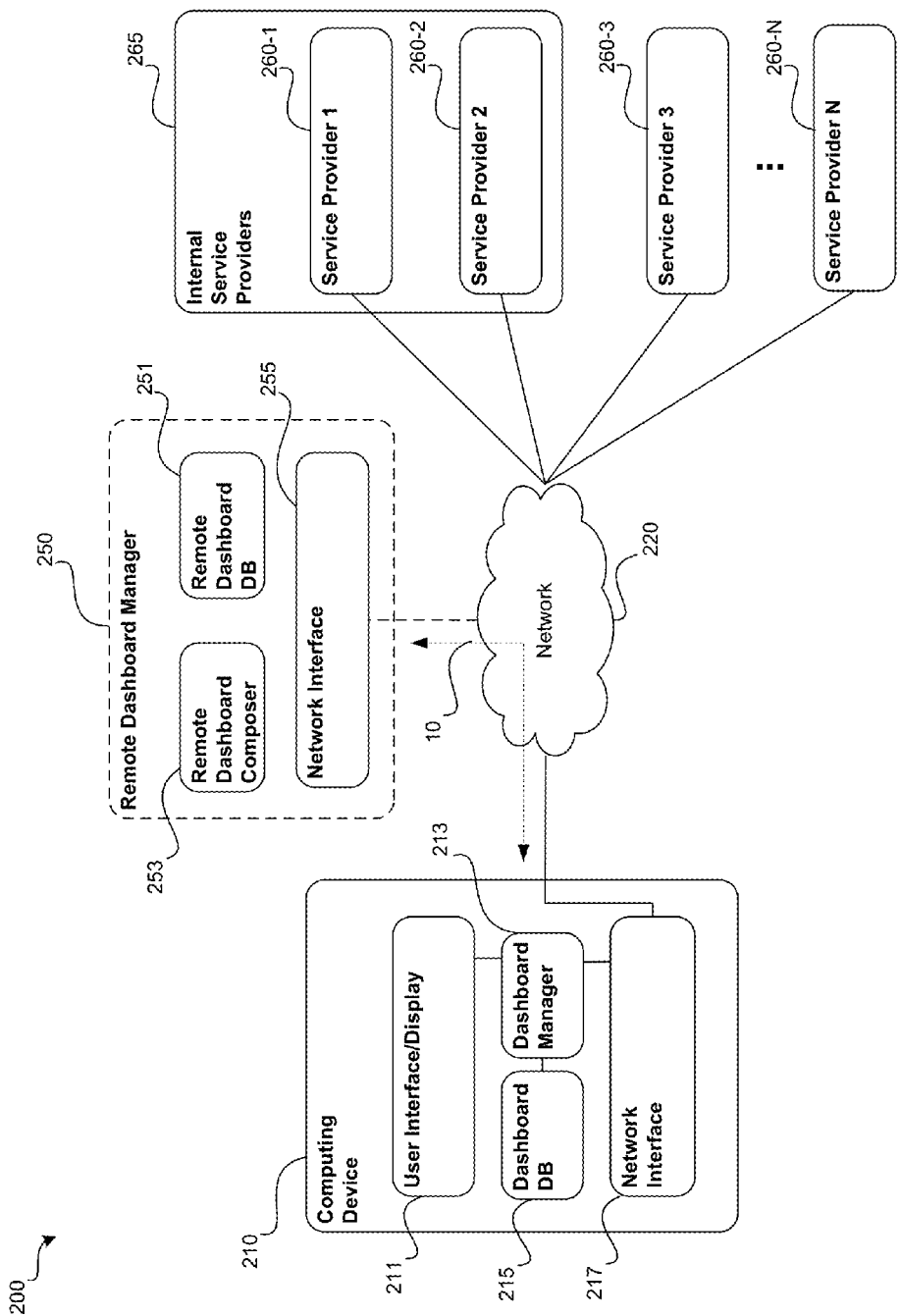
FIG. 2 illustrates a system for creating and rendering dashboards, according to an embodiment of the present disclosure.

FIG. 2 illustrates an example system for creating, initiating, and editing dashboards, according to various embodiments of the present disclosure. System 200 can include computing device 210 in electronic communication with remote dashboard manager 250 and multiple service providers 260 through network 220. Network 220 can include any type of local area or wide area electronic communication media or protocols. For example, network 220 can include wired and wireless local area networks (LANs), such as Ethernet, IEEE 802.11x (a.k.a. Wi-Fi), etc. In addition, network 220 can include open and secure wide area networks (WANs), such as the Internet, and communicate over protocols like general packet radio services (GPRS), 3G, 4G long-term evolution (LTE), worldwide interoperability for microwave access (WiMAX), etc., to facilitate communication between geographically separated computing devices 210, remote dashboard manager 250 and service providers 260. Accordingly, the computing device 210, the remote dashboard manager 250, and the service providers 260 can be configured to communicate over one or more wired or wireless electronic communication media using various open or secured communication protocols in order to communicate with one another. For example, computing device 210 may include a smart phone or a tablet computer equipped to communicate wirelessly using Wi-Fi or 4G LTE to send requests to, and receive responses from, remote dashboard manager 250 and/or any of the service providers 260.

As noted, computing device 210 can include a portable computing device. The portable computing device can include a number of components implemented in software, firmware, hardware, or a combination thereof. In one embodiment, the portable computing device can include a network interface 217 configured to encode and transmit signals from the portable computing device through network 220 to one or more other entities. The portable computing device may also include a dashboard manager 213, a dashboard database 215, and a user interface/display module 211. The dashboard manager 213 may be implemented as a combination of software and hardware, such as a computer processor executing computer readable code. For instance, the dashboard manager may be a standalone application or a component in another application or operating system. The dashboard database 215 can be implemented as computer readable code stored on any type of transitory or non-transitory computer readable medium, e.g., a relational database that links dashboards identifiers with one or more dashboard models stored on a non-volatile flash memory. In such embodiments, the dashboard manager 213 can access the local dashboard database 215 in response to user input received through the user interface/display module 211.

The user interface/display module 211 can include any type of or combination of computer output and input devices, such as a touchscreen, a microphone, display panel, keyboard, etc. In one embodiment in which the user interface/display module 211 includes a touchscreen, receiving user input can include receiving a user selection of an icon or other control to initiate the dashboard manager 213. Once the dashboard manager 213 is invoked, the dashboard manager 213 can render a user interface (UI) on the user interface/display device 211. The UI may include a graphical user interface (GUI) that forms the framework of navigation and display scheme of the dashboard. Through controls provided in the GUI, such as menus, buttons, sliders, and text fields, the computing device 210 can receive user input to access one or more predetermined dashboard models or previously created dashboards from the dashboard database 215. In response to the user input, dashboard manager 213 can access the dashboard database 215 and load a particular dashboard model or previously determined dashboard into the GUI framework. The dashboard manager 213 can then render a GUI that includes one or more dashboards displayed on user interface/display device 211. As used herein, the terms dashboard model refers to a set of instructions and specifications that can be used to instantiate a particular dashboard. In some embodiments, the dashboard model can include a complete or partial description of the visual analytics that are to be loaded into the resulting dashboard. The dashboard model can also include a complete or partial description of how the individual visual analytics are arranged within the resulting dashboard, as well as describe how the individual visual analytics may be rearranged relative to one another. In some embodiments, the dashboard model can also specify how often each of the component visual analytics that receive updated information from an internal or external service provider should be updated, if at all. The dashboard model can also include a description or other metadata that describes the intended audience or use of the dashboard. For instance, the dashboard model can include a description of the work group of user who should use the dashboard, or description of the collection of visual analytics in the dashboard (e.g., an accounting dashboard, a manufacturing dashboard, etc.).

The GUI framework or the dashboard may also include connections through which the dashboard manager 213 can receive commands from the operating system of the computing device 210. For example, the GUI framework or the dashboard can receive commands through gestures or patterns detected through the touchscreen of the user interface/display module and interpreted by the operating system. Detectable gestures can include tracking the absolute and relative motion of one or more of fingers or styli over the surface of the touch screen. The absolute or relative tracked motions, like pinching, spreading, and swiping using one or multiple fingers over the touchscreen, can be interpreted by the operating system and/or the dashboard manager to select, control, or navigate various dashboards according the dashboard model.

In one embodiment, the portable computing device can also include a motion-sensing device, such as an accelerometer or gyroscope, which can detect motion of the computing device as a whole to determine movement and orientation. The operating system or the dashboard manager can interpret detected motion to activate one or more controls built into the dashboard manager 213 or the associated dashboard. For example, a portable computing device 210 can sense the orientation of the user interface/display device 211. Based on the determined orientation, the dashboard manager 213 and/or the user interface/display 211 can change the rendered dashboard in predetermined manner. For example, if the computing device 210 is rotated from a portrait to a landscape orientation, the dashboard manager 213 can re-render the dashboard to zoom in on a particular active element or visual analytic in the dashboard or it can change the size or proportions of the dashboard to include more or fewer visual analytics.

As discussed above, the portable computing device can use a local dashboard manager 213 and a local dashboard database 215 to generate new dashboards or load existing dashboards. In another embodiment, the dashboard manager 213 can include a local application executed by the portable computing device 211 dedicated to communicating with remote dashboard manager 250 through network interface 217 and network 220. In such embodiments, the dashboard manager 213 resident in the computing device 210 can receive predetermined dashboard models or previously defined dashboards from the remote dashboard manager 250.

Remote dashboard manager 250 may include a remote dashboard composer 253, and remote dashboard database 251 accessed through the network interface 255. In such embodiments, the remote dashboard composer 253, as well as remote dashboard database 251, can be accessed by various computing devices through the network 220.

Remote dashboard composer 253 can include a number of tools for designing, populating, and saving dashboards based on predetermined dashboard models retrieved from the remote dashboard database 251 and visual analytics provided by service providers 260. In some embodiments, visual analytics can be designed on the fly while a dashboard is being populated based on guidance included in the particular dashboard model used or the associated GUI navigation framework. The resulting dashboards, or a corresponding dashboard model, can be stored in the remote dashboard database 251. Computing devices 210 can then access remote dashboard manager to retrieve previously determined dashboards from the remote dashboard database 251.

Alternatively, a dashboard model designed or a dashboard created on computing device 210 can be uploaded to the remote dashboard database 251 so that the remote dashboard manager 250 can make such dashboard models or dashboards available to multiple users and/or computing devices. Centralized repositories of dashboard models are particularly useful for distributing identical dashboards to multiple users. For example, the previously discussed sales manager might determine that a particular sales team or group of salespersons may benefit from a particular perspective of sales data. With that particular perspective in mind, the sales manager, with or without the help of an IT professional, may devise a number of pertinent visual analytics. The visual analytics can then be loaded into one or more dashboards instantiated from one or more related or unrelated dashboard models. Without undue effort, the sales manager can create a custom dashboard, or set of dashboards, that he or she determines to be helpful to particular set of salespeople. The dashboards created by the sales manager may be unlocked such that the individual users can edit the dashboards according to their own needs or preferences. Alternatively, the dashboards can be locked such that only authorized users can only edit them.

In some embodiments, dashboards rendered in the user interface/display module 211 of the portable computing device 210 can include a combination of dashboards stored locally in the onboard dashboard database 215 and dashboards stored and retrieved from the remote dashboard database 251. Any and all of such dashboards can include a number of associated visual analytic identifiers or definitions. Visual analytic identifiers or definitions can be associated with one or more service providers 260 from which the visual analytics receive the data. In some embodiments, the dashboard manager or the visual analytics in a particular dashboard can send periodic requests to one or more service providers 260 to for real time or time delayed updates to the visual analytics. In other embodiments, the dashboard can receive periodic pushed updates from the service providers 260, thus alleviating the need for the dashboard or the visual analytics to send requests for such updates.

Some or all of the service providers 260 can be associated with a particular remote dashboard manager 250 or a particular computing device 210. In such embodiments, some service providers 260 can be considered internal service providers 265. Internal service providers 265 may require fewer or lower-level security protocols when communicating with computing device 210. However, service providers which are not grouped within the internal service providers 265 may be required to include various authentication or authorization tokens or keys with the data they send or provide to one or more of the visual analytics displayed on in a dashboard on computing device 210.

Method for Initiating, and Displaying Dashboards

Figure 3:
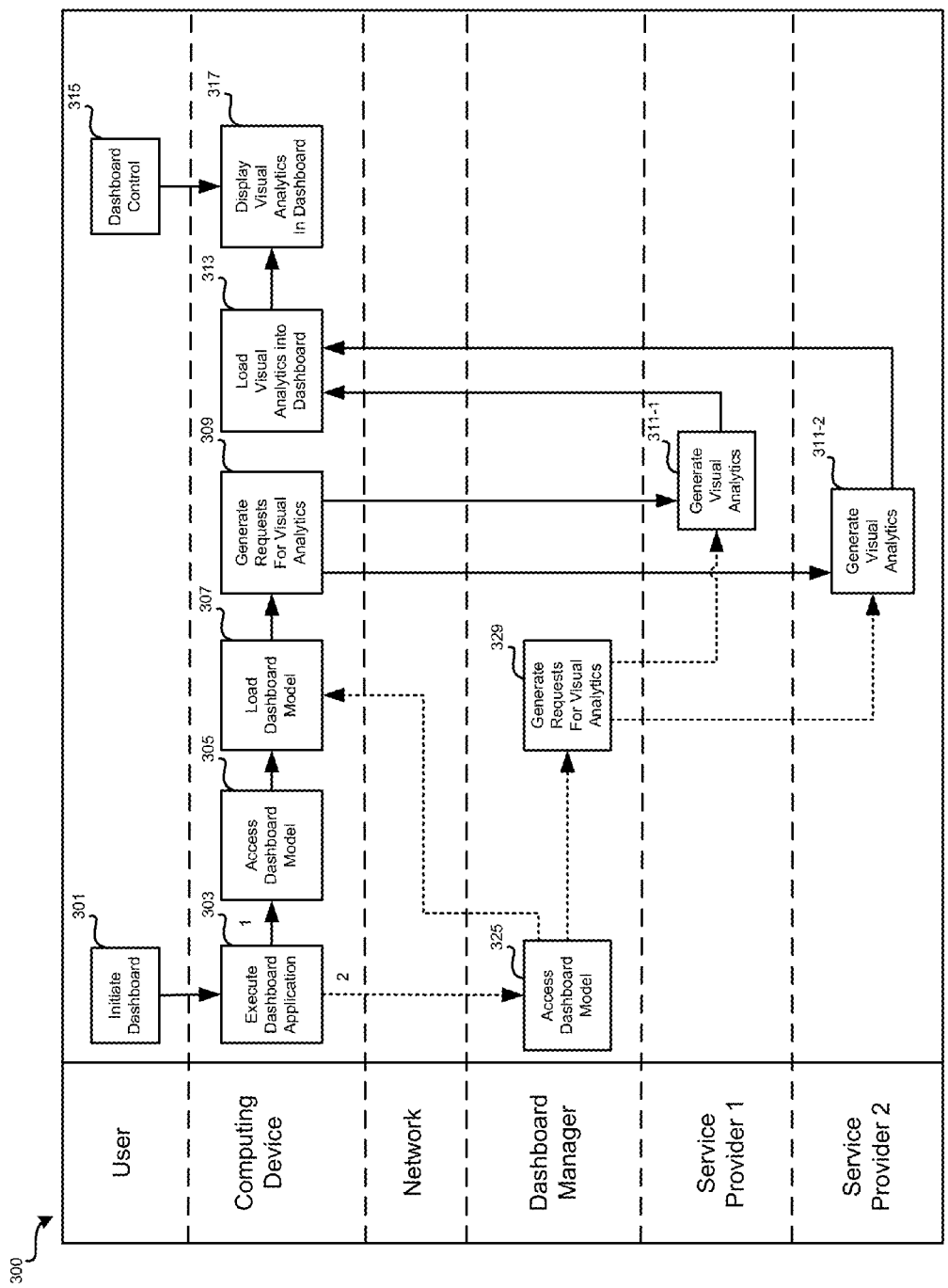
FIG. 3 illustrates data flows of for creating and rendering dashboards, according to an embodiment of the present disclosure.

FIG. 3 is a flowchart of a method 300 for initiating and displaying dashboards with a predetermined navigation framework, according to various embodiments the present disclosure. As used herein, the term navigation framework may refer to the backend functionality that allow for navigation within and among a dashboard instantiated from a particular dashboard model. In some embodiments, the navigation framework may include a default set of controls and organization elements for rendering the visual analytics and controls of any dashboard. In other embodiments, the default set of controls and organization elements may be overridden by definitions and specification contained in a particular dashboard model. For example, a default set of controls and organization elements may include various navigation buttons for moving from one visual analytic to another. The same set of controls and organization elements may also include specifications of individually navigable channel sections in which various visual analytics are rendered. In some embodiments, the visual analytics are grouped into the channel sections based on visual analytics types. Thus, navigating within each type of visual analytic may be navigated separately by navigating within the corresponding channel section. For instance, the dashboard may include three separate horizontally navigable channels sections for three corresponding visual analytic types. Thus the visual analytics in one channel may be scrolled, while the visual analytics in another channel section may remain stationary. As used herein, the terms channel and channel section can be used interchangeably to refer to sections in a dashboard into which visual analytics are grouped for display and navigation.

Method 300 begins when a user initiates a dashboard using a user interface of the computing device 210 at box 301. In response to user input, computing device 210 can retrieve a particular dashboard model at box 303. In some embodiments, any and all of the actions completed by the computing device 210 can be completed by a dashboard manager 213 implemented as code executed by a processor. In one embodiment, the method follows path 1 and includes the dashboard manager 213 of computing device 210 accessing a dashboard model from a local dashboard database 215. The dashboard manager 213 can then load the dashboard model to generate a particular dashboard configuration within the navigation framework. The dashboard model can include a visual analytic layout, visual analytic identifiers, and controls for navigating the dashboard.

Once the dashboard is generated, or as part of the dashboard generation, the dashboard manager 213 can generate requests for visual analytics based on information included in the dashboard model, at box 309. The requests for visual analytics can include requests for historic, current, and forecast data provided by various service providers 260. Alternatively, the request for visual analytics can include requests for complete visual analytics generated by one or more of the service providers 260. Completed visual analytics generated by a service provider 260 can be streamed through network 220 to be displayed on the user interface/display device 211 of computing device 210. In any case, the request for visual analytics generated at box 309 can be sent to one or more service providers 260.

Service providers 260 can then generate the requested data or visual analytics in boxes 311. The generated visual analytics can then be sent back to the dashboard manager 213. Once dashboard manager 213 receives the generated visual analytics or data, the dashboard manager 213 can generate, render, and/or load the visual analytics into the dashboard, at box 313, according the dashboard model and/or user input. The dashboard manager 213 can then render the resulting dashboard to display the visual analytics on the user interface/display device 211 of the computing device 210, at box 317. With the dashboard displayed, the computing device 210 or dashboard manager 213 can receive user input entered by the user through the dashboard controls, at box 315.

In another embodiment, in which dashboard models are stored in the remote dashboard manager 250, method 300 can follow optional path 2 when retrieving the dashboard, at box 303. In such embodiments, the dashboard manager 213 can send a request to remote dashboard manager 250. In response to the request, the remote dashboard manager 250 can access the remote dashboard database 251, at box 325. At this point, remote dashboard manager 250 can send the requested dashboard model back to the computing device 210. The computing device 210 can then proceed along the remainder of path 1 as described above. Alternatively, the remote dashboard manager 250 can use the requested dashboard model to generate requests for the visual analytics specified, at box 329, and send the requests to the appropriate service providers 260. In much the same way that the service providers 260 generated the visual analytics described above in reference to path 1, the service providers 260 can respond to the requests received from the remote dashboard manager 250 and send the requested visual analytics directly to the requesting computing device 210. Alternatively, though not shown in the flowchart 300, the generated visual analytics from the service providers 260 can be returned back to the remote dashboard manager 250 which can then relay the generated visual analytics back to the requesting computing device 210.

Method for Creatine Dashboards

Figure 4:
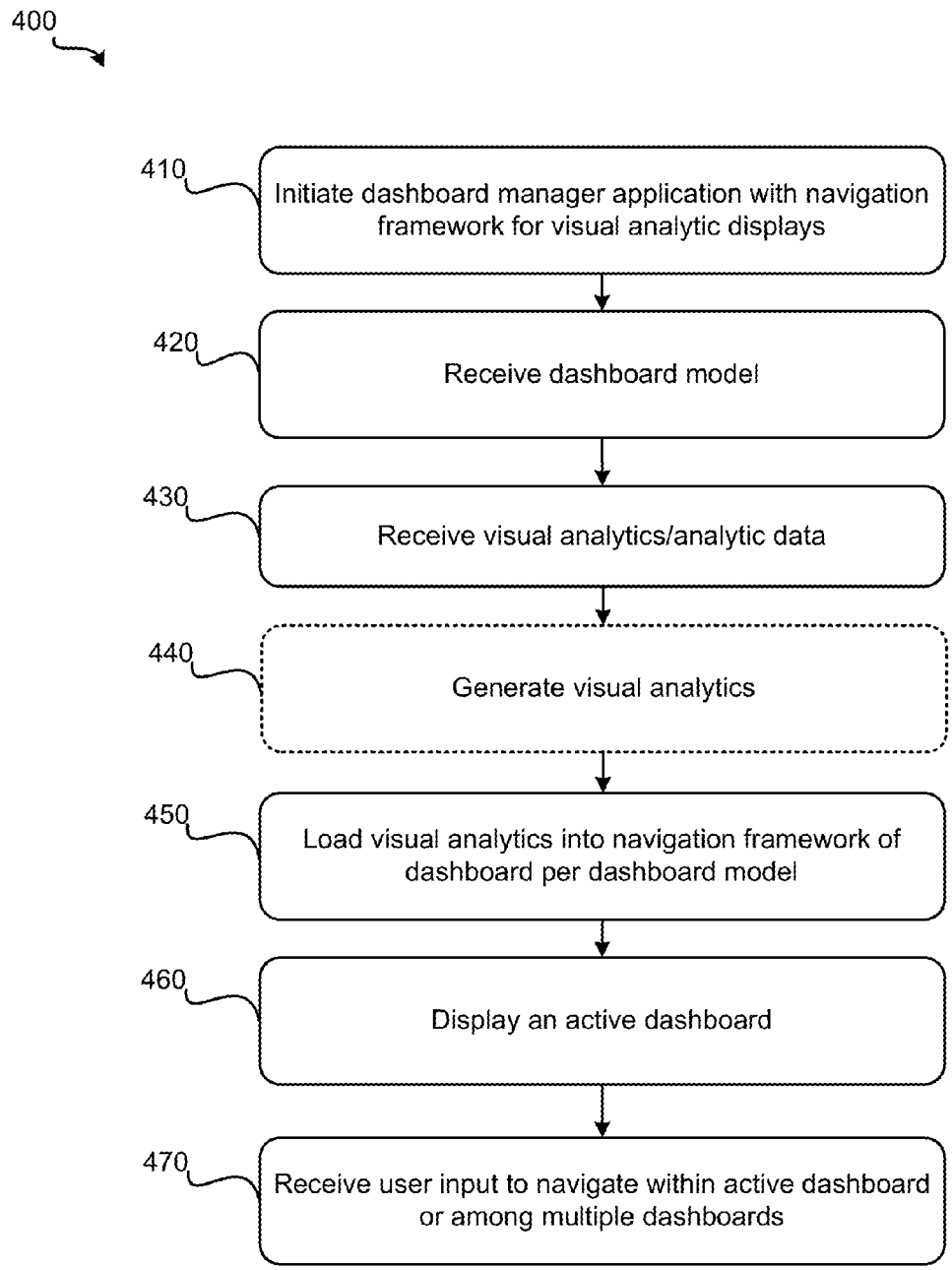
FIG. 4 illustrates a method for rendering dashboards, according to an embodiment of the present disclosure.

FIG. 4 illustrates a flowchart of a method 400 for creating dashboards according to an embodiment of the present disclosure. Method 400 may begin at action 410 in which computing device 210 initiates a navigation framework for visual analytic displays. Initiating the navigation framework can include executing a standalone or client application executed by one or more processors in the computing device 210. In one embodiment, the application can include a dashboard manager 213. In action 420, the dashboard manager can receive a dashboard model from a local dashboard database 215 or from remote dashboard manager 250 or remote dashboard database 251 in response to input received from a user. The dashboard manager 213 can analyze the dashboard model to determine a complete or partial description of the desired resulting dashboard. In such embodiments, the dashboard model can include a complete or partial list of the visual analytics to be included in the resulting dashboard. The list of visual analytics can include a list of visual analytic identifiers that correspond to a locally or remotely stored visual analytic definition. Alternatively, the list of visual analytics may include the actual visual analytic definitions. As used herein, the term visual analytic definitions can include detailed descriptions of corresponding visual analytics. For example, visual analytics can include any type and combination of chart, graph, and alphanumeric data. Accordingly, the corresponding visual analytic definitions can include the definitions of the functions and expressions and the ranges, scale, and legends used to render the visual analytic. The visual analytic definitions can also include a service provider identifier, protocol, or link that the dashboard manager can use to locate and communicate with the service provider to obtain the data used to generate the visual analytic.

Using the dashboard model, the computing device 210 can generate various requests for visual analytics/analytic data from one or more service providers. In response to the requests, the computing device 210 can receive the requested visual analytics/analytic data, in action 430. In one embodiment, in which the service providers only provide analytic data, the dashboard manager 213 can generate the visual analytics, in action 440. Action 440 is depicted as optional as indicated by the dotted lines. Once the visual analytics are received or generated, the dashboard manager 213 can load of the visual analytics into the navigation framework per the dashboard model, in action 450. For example, the dashboard model can define where and in which each visual analytics are to be within the channel sections of the dashboard and/or navigation framework. With at least some of the visual analytics loaded into the navigation framework, the dashboard manager 213 can render the resulting dashboard as the active dashboard in a corresponding user interface/display device 211, in action 460. Once the active dashboard is displayed, the computing device 210 or the dashboard manager 213 can receive user input to navigate within the active dashboard or among the multiple dashboards according to the navigation framework and/or the dashboard model.

Method for Creating and Editing Dashboards

Figure 5:
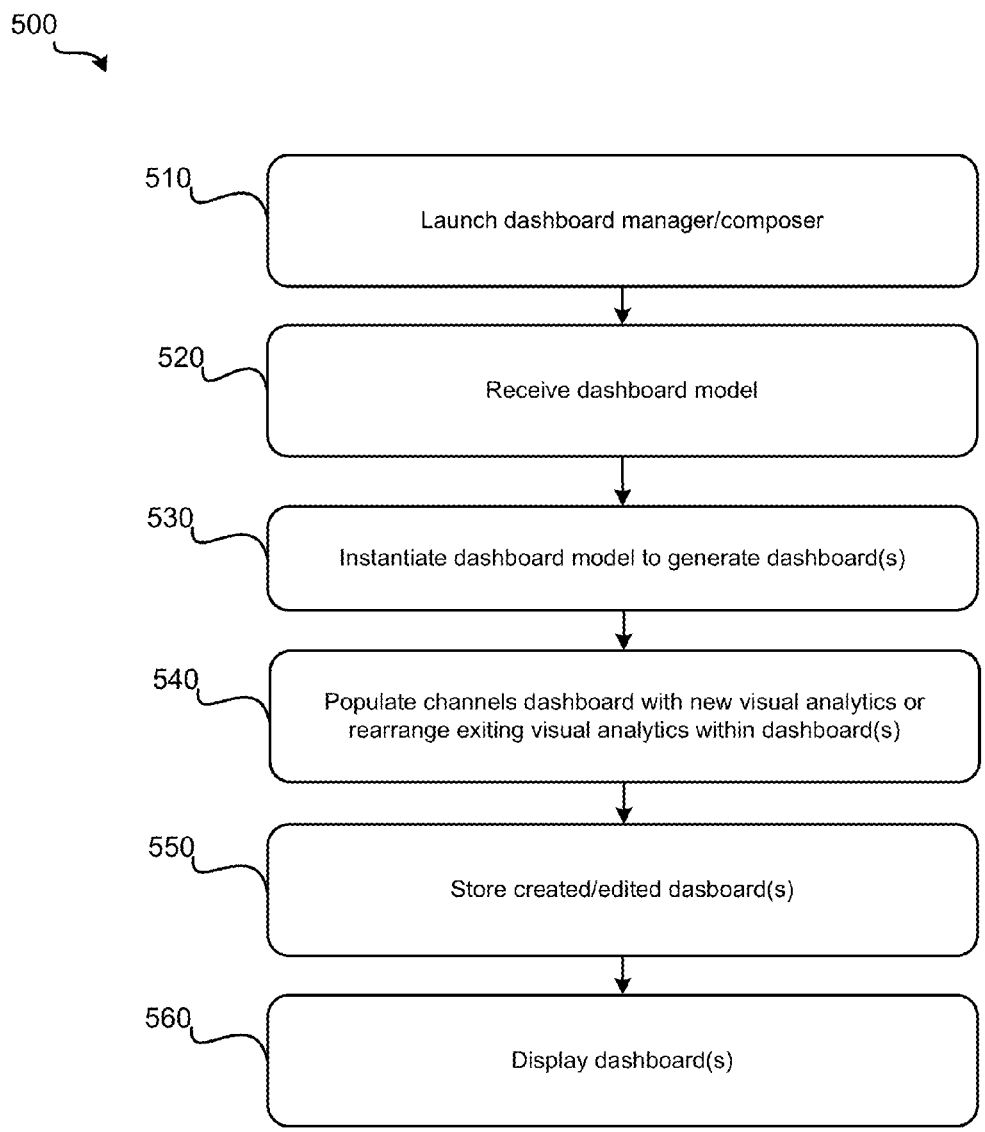
FIG. 5 illustrates a method for creating, editing and rendering dashboards, according to an embodiment of the present disclosure.

FIG. 5 illustrates a method 500 for creating and editing dashboards, according to various embodiments of the present disclosure. The method 500 can begin at action 510 in which computing device 210 or a remote server computer launches a dashboard manager. In some embodiments, the dashboard manager can include a dashboard editor or composer. In other embodiments, the dashboard manager can use the services or functions of a remote dashboard editor composer. In either such embodiments, the dashboard manager can receive a dashboard model, in action 520

Receiving the dashboard model may include retrieving a particular dashboard model from an associated dashboard database in response to user input. In other embodiments, receiving the dashboard model may include passively receiving the dashboard model that is pushed from the remote computing device or server computer. Receiving a pushed dashboard models can facilitate implementations of automatic updates of one or more existing dashboards or dashboard models.

Once the dashboard model is received, the dashboard manager can instantiate the dashboard model to generate one or more dashboards, in action 530. In some embodiments, instantiating the dashboard model can generate an empty dashboard (e.g., a dashboard that is not populated with any visual analytics) or a partially populated dashboard (e.g., a dashboard that has at least some visual analytics arranged within the navigation framework of the dashboard according to specifications in the model). Once the dashboard is instantiated, the dashboard manager can populate the dashboard with new visual analytics or rearrange existing visual analytics of the dashboard. In some embodiments, population of the visual analytics can occur automatically, while in other embodiments, selection and placement of the visual analytics can be in response to user input.

Editing functionality of the dashboard manager can be accessed through controls integrated into an instantiated dashboard. For example, the dashboard can include buttons, menus, keyboard commands, etc. for activating functionality for adding, deleting, or rearranging visual analytics in the dashboard.

In action 550, once all the additions, deletions, and rearrangements of the visual analytics are complete, or at some interim point, the dashboard manager can store the completed dashboard as an instantiated dashboard or as a new dashboard model. In some embodiments, storing the dashboard or dashboard model can include associating one or more users with the dashboard. When a dashboard is associated with a user, it can then be used as a default dashboard, or as part of a default collection of dashboards, when that particular user invokes the dashboard manger. In some scenarios, the user who creates a dashboard can be the user with whom the complete dashboard is associated. Accordingly, any user, even non-technical business users can create, edit, and rearrange visual analytics within the navigation framework or as defined in the dashboard model.

The complete or stored dashboard can be loaded or retrieved to be displayed in action 560. Displaying the dashboard may include loading a default starting view or loading the last configuration shown when the dashboard was last viewed. In addition, displaying the dashboard may include connecting the user inputs connections of the dashboard to the operating system of the computing device 210 to monitor for user input received through the user interface devices of the computing device, such as the touchscreen or the motion sensor.

Example Use Cases and Dashboards

Specific functionality of dashboard and navigation framework embodiments will now be discussed in reference to a specific example dashboard illustrated in FIGS. 6 to 26. Some or all of the described features of the example dashboard can be implemented in various dashboard and navigation framework embodiments.

Figure 6:
FIGS. 6-26 illustrate a use case and a particular dashboard with multiple panels with corresponding horizontally navigable channels, according to various embodiments of the present disclosure.

FIG. 6 is a screenshot of a homepage 600 generated by a dashboard manager according to the specifications of a particular dashboard model. As shown the homepage 600 includes a title bar 601. The title bar 601 may include various information including the title of the homepage 600, identification of an associated user or group of users 603, and control 611. Homepage 600 can also include a number of pages or panels 605, 607, and 609. Each one of the panels can include one or more dashboards that may include information, visual analytics, and tools for interacting with, editing, or controlling various aspects of the constituent display components. In the particular example shown, homepage 600 is currently configured to display the panel 605. The panel 605 is a kind of dashboard that depicts a number of available dashboards 610 available within the panel 605, which may be referred to herein as a main panel. As shown, each one of the available dashboards 610 may be represented by a selected visual analytic that is representative of the information or analytics available within each of the respective dashboards 610. Homepage 600 or panel 605 may also include other controls or indicators, such as control 620 that indicates the number of available pages within a particular panel.

Figure 7:
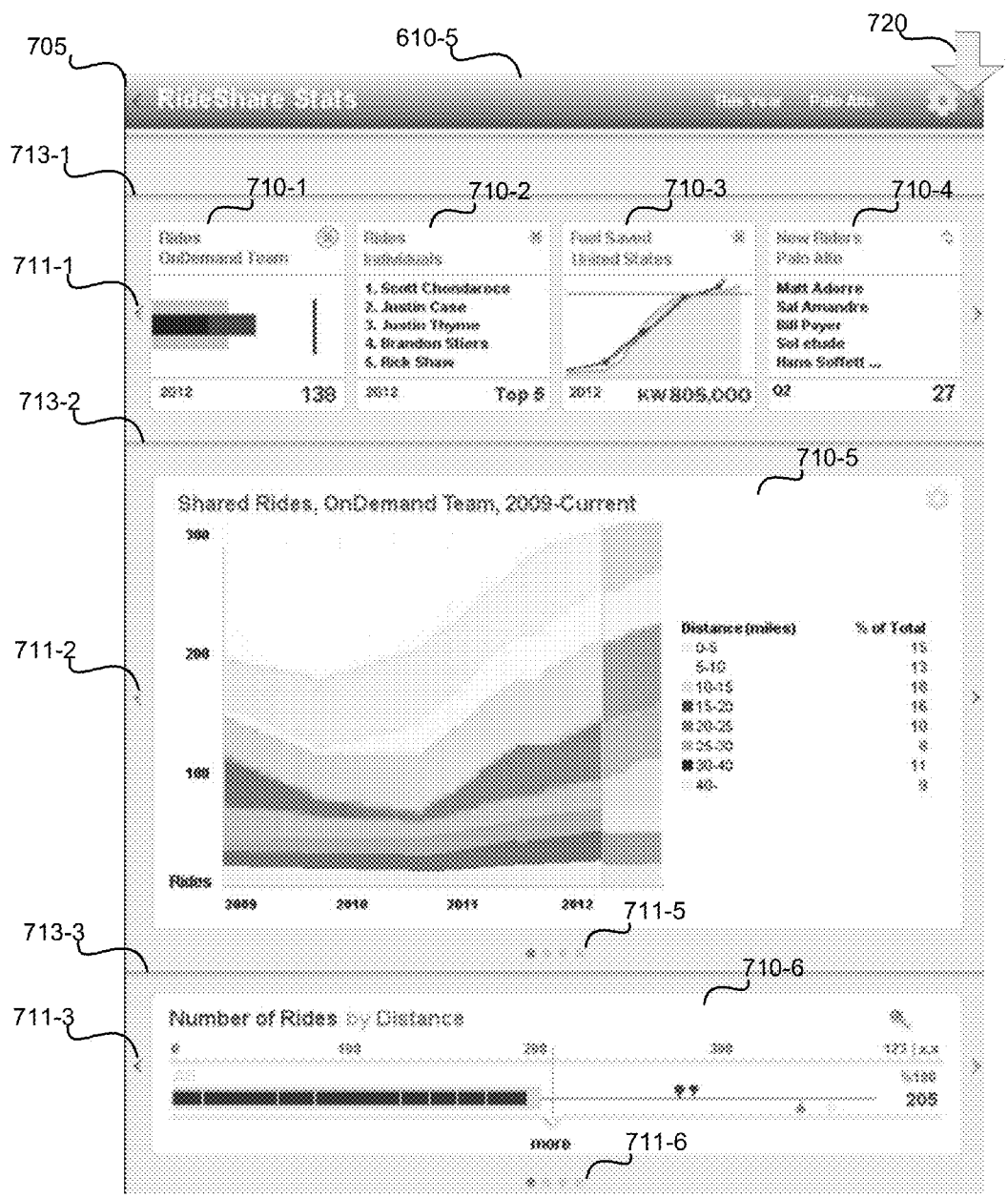

To navigate to one of the dashboards 610, a user may select the corresponding visual analytic, or other icon that represents the dashboard. For instance a user may select dashboard 610-5, as indicated by arrow 613. As discussed herein, the contents of the homepage 600 may be displayed on any type of user interface/display device of a corresponding computing device. Without limiting the scope of the present disclosure, various embodiments depicted in FIGS. 6 through 26 will be described in reference to the portable computing device that includes a touchscreen user interface/display and a motions sensor for accepting user input. For example, the portable computing device can be any type of tablet computer, such as an Apple iPad®, a Microsoft Surface®, or a Google Android® equipped tablet computer. Accordingly, the user input indicated by arrow 613 can be accomplished by a user touching the surface of the touchscreen display on or around the visual analytic or icon representing dashboard 610-5. In response to the user input 613, the dashboard manager executed on the tablet computer can render the rideshare stats dashboard 610-5 as the active dashboard, as depicted in FIG. 7.

When dashboard 610-5 is active, the dashboard can be depicted with a title bar 705 that can include various information and controls specific to dashboard 610-5. In one embodiment, a dashboard, such as dashboard 610-5, may include multiple channels 713 in which visual analytics 710 may be displayed. Each one of the channels 713 may be disposed and dimensioned relative to one another to display and/or navigate a particular visual analytic type. Specifically, channel 713-1 may be positioned and dimensioned and include controls 711-1 to quickly and efficiently depict concise single point type visual analytics such as visual analytics 710-1, 710-2, 710-3, and 710-4. The controls of 711-1, located on either side of the channel 713-1 may be used to scroll horizontally through the available single point type visual analytics. Similarly, channel 713-2 may be positioned and dimensioned and include controls for displaying and navigating detailed poster type visual analytics, such as a visual analytic 710-5, such as associated navigation controls 711-2 and 711-5. Finally, dashboard 610-5 may also include channel 713-3 that is positioned and dimensioned and includes controls 711-3 and 711-6 for displaying and navigating comparative visual analytics, such as visual analytic 710-6. While each of the channels 713 are depicted with arrow type controls 711 for navigating horizontally through associated visual analytics 710 in each of the channel 713, various embodiments implemented in tablet computers also allow for a user to swipe across the surface of the touchscreen to scroll through the visual analytics 710 displayed in each of the channels 713.

Figure 8:
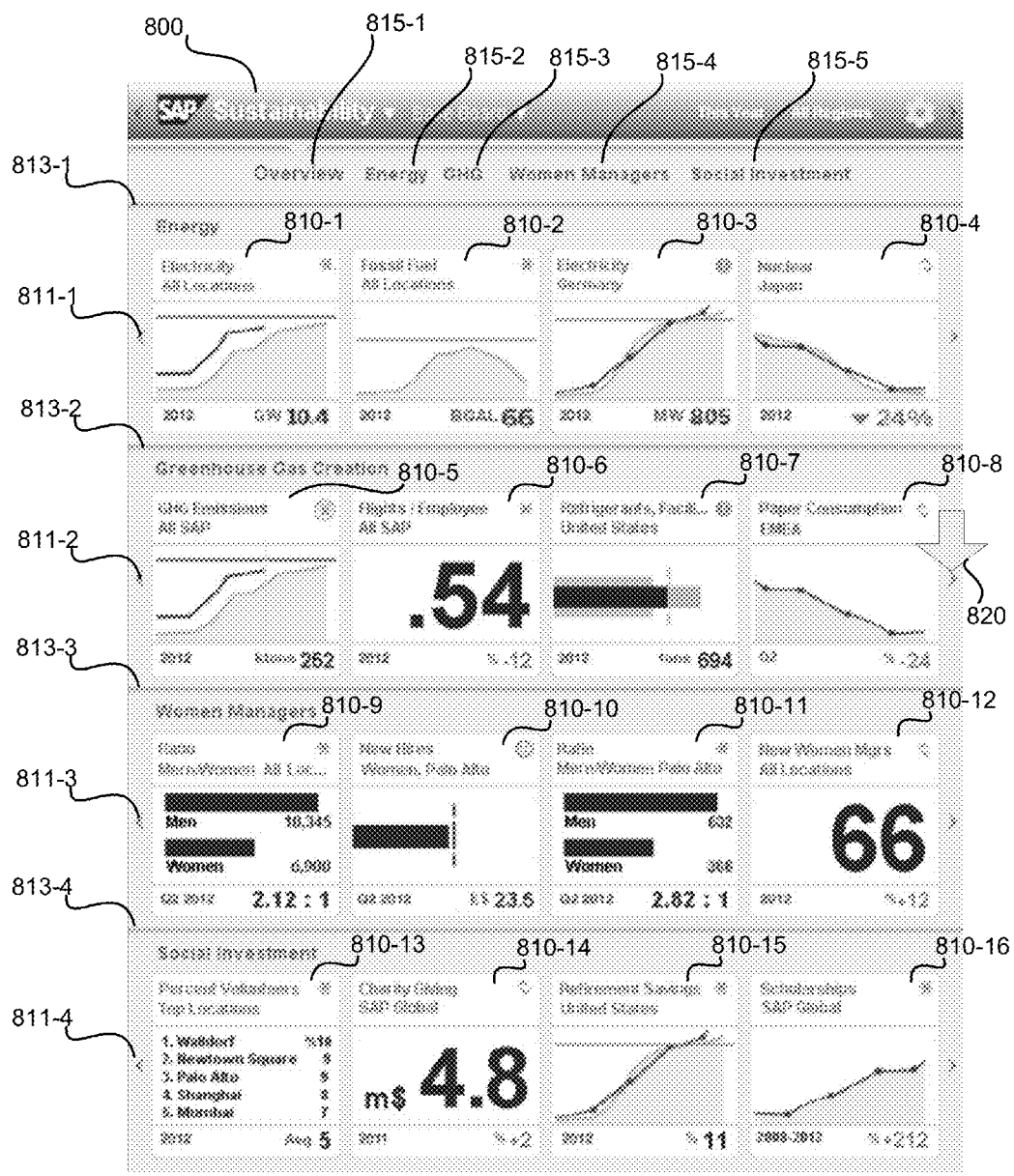

In some embodiments, the title bar 705 may also include controls that are operable by touchscreen type swipes or touches. Such controls in the title bar 705 provide a mechanism for users to quickly navigate among different dashboards. For instance, a user may horizontally navigate among dashboards by swiping horizontally along the title bar 705 or touching the arrow type control in the title bar indicated by the arrow 720. In response to user input to horizontally navigate through dashboards, the dashboard monitor may generate and render another dashboard 800, as illustrated in FIG. 8. The specific example of a dashboard 800 shown in FIG. 8 is a sustainability dashboard having multiple panels 815. Each one of the panels 815 can include a different collection and different depiction of visual analytics pertaining to various aspects of the sustainability dashboard 800. In the particular depiction of sustainability dashboard 800 shown in FIG. 8, the overview panel 815-1 is displayed. The overview panel 815-1 can include multiple channels 813 that each displays a subset of the visual analytics 810 corresponding one of the panels 815.

For instance, channel 813-1 for energy depicts a collection of visual analytics 810-1 through 810-4 from the energy panel 815-2. Similarly, channels 813-2 through 813-4 each include a selection of visual analytics 810 from a corresponding panels 815-3 through 815-5. As shown, each of the channels 813 may also include one or more navigation controls 811 for horizontally navigating through the corresponding visual analytics 810, in addition to the touchscreen sensitive controls for swiping on or near one of the channels 813 to scroll through the available visual analytics 810. For example, in response to user input to horizontally navigate through the greenhouse gas creation channel 813-2 as depicted by arrow 820, the dashboard manager may change the visual analytics displayed in channel 813-2. The changes in dashboard 800 are depicted in FIG. 9.

Figure 9:
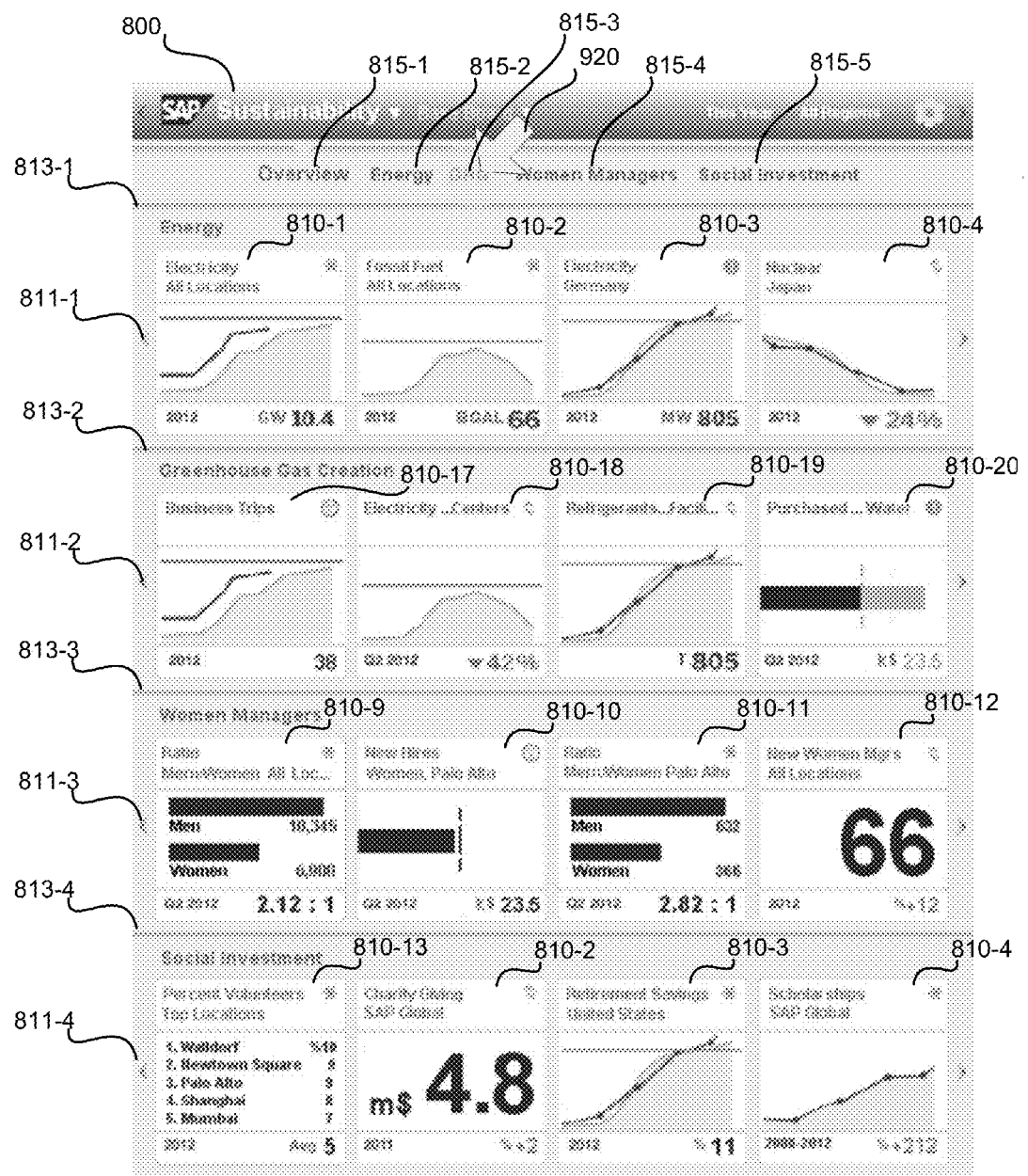

As shown in FIG. 9, channel 813-2 has been horizontally shifted to change which visual analytics 810 are shown. Specifically visual analytics 810-5 through 810-8 in channel 813-2 have been replaced by a visual analytics 810-17 through 810-20. The change between the depiction of the dashboard 800 in FIG. 8 and the depiction of dashboard 800 in FIG. 9 may be accompanied by a graphical or animated representation of the visual analytics within channel 813-2 scrolling horizontally from one side to the other.

Figure 10:
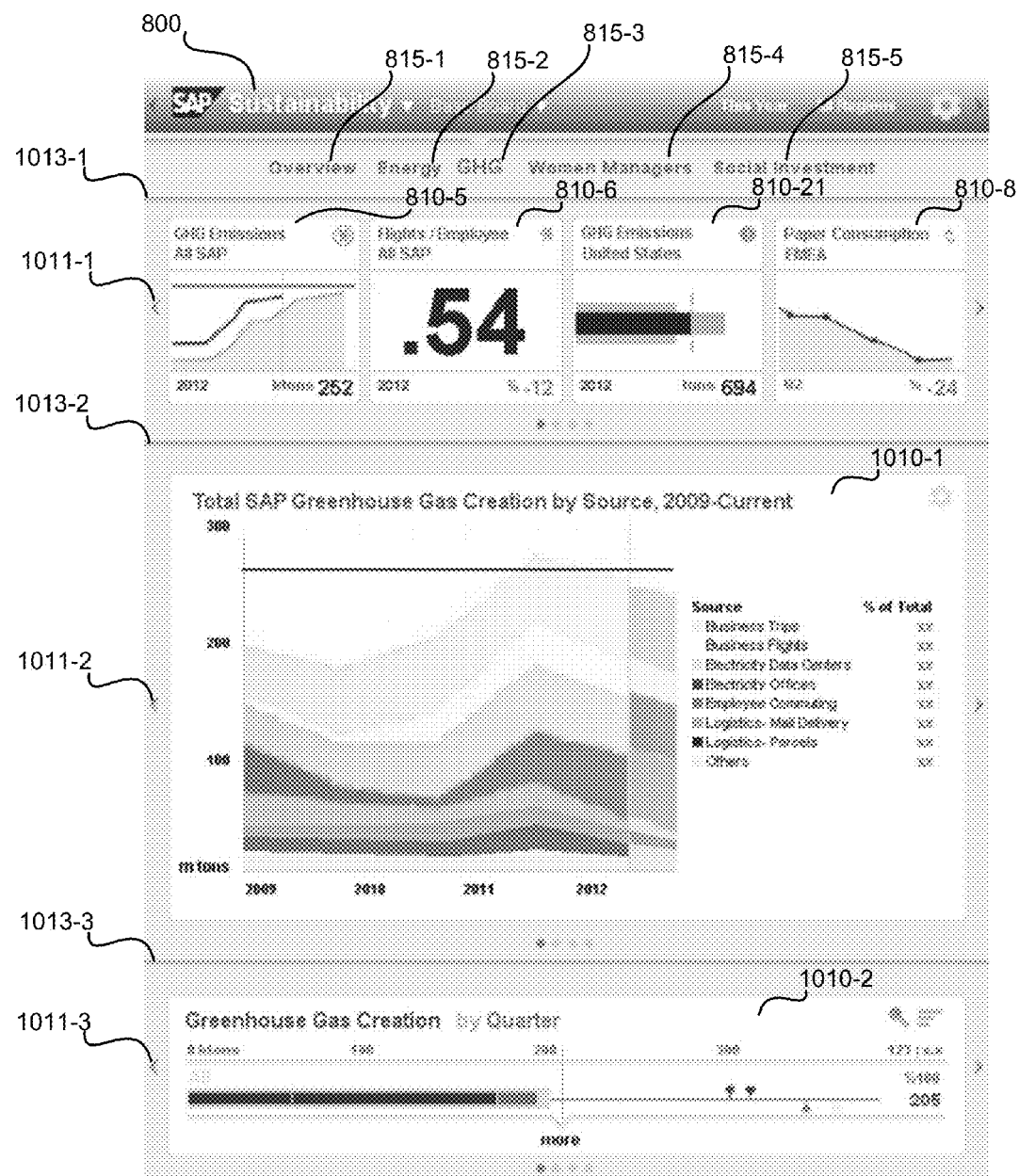

To change the display of dashboard 800 to display visual analytics associated with the greenhouse gas creation panel, the dashboard manager may receive a user input as indicated by arrow 920 at the panel control 815-3. In response to the user input 920, the dashboard manager may render the three-channel representation of the panel 815-3, as shown in FIG. 10. Panel 815-3 may include channels 1013-1 through 1013-3 to depict three corresponding types of visual analytics. For example, general 1013-1 may include the single point type visual analytics 810 that are also depicted in the channel 813-2 of the overview panel 815-1. Channel 1013-2 may be positioned and dimensioned and may include controls for displaying and navigating visual analytics of another type, such as visual analytic 1010-1. Finally channel 1013-3 may be positioned and dimensioned and may include controls for displaying and navigating yet another type of visual analytic, such as visual analytic 1010-2. Each channel 1013 may include controls 1011, in addition to the touchscreen type navigation controls, for horizontally navigating the respective channel.

Figure 11:
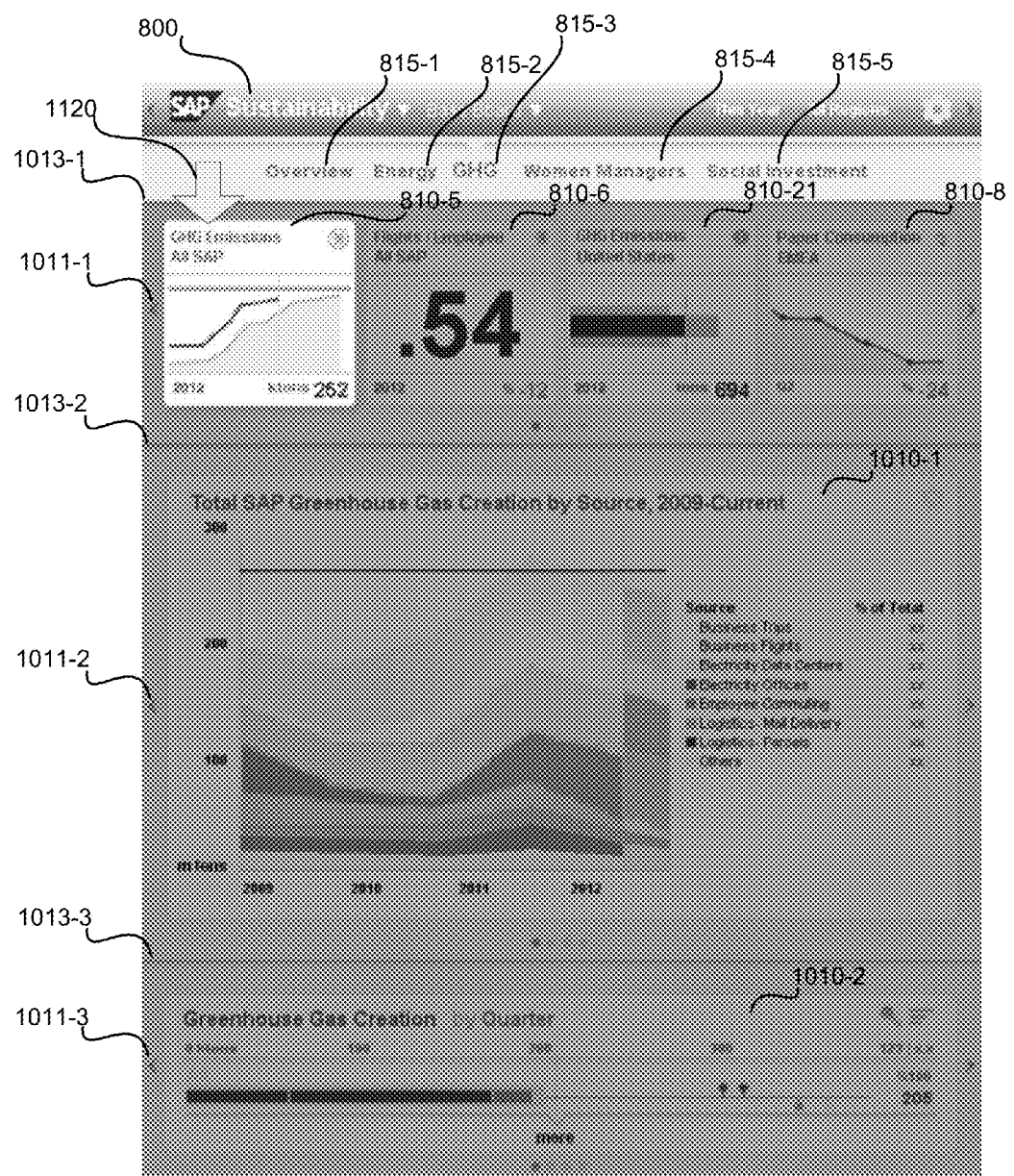
Figure 12:
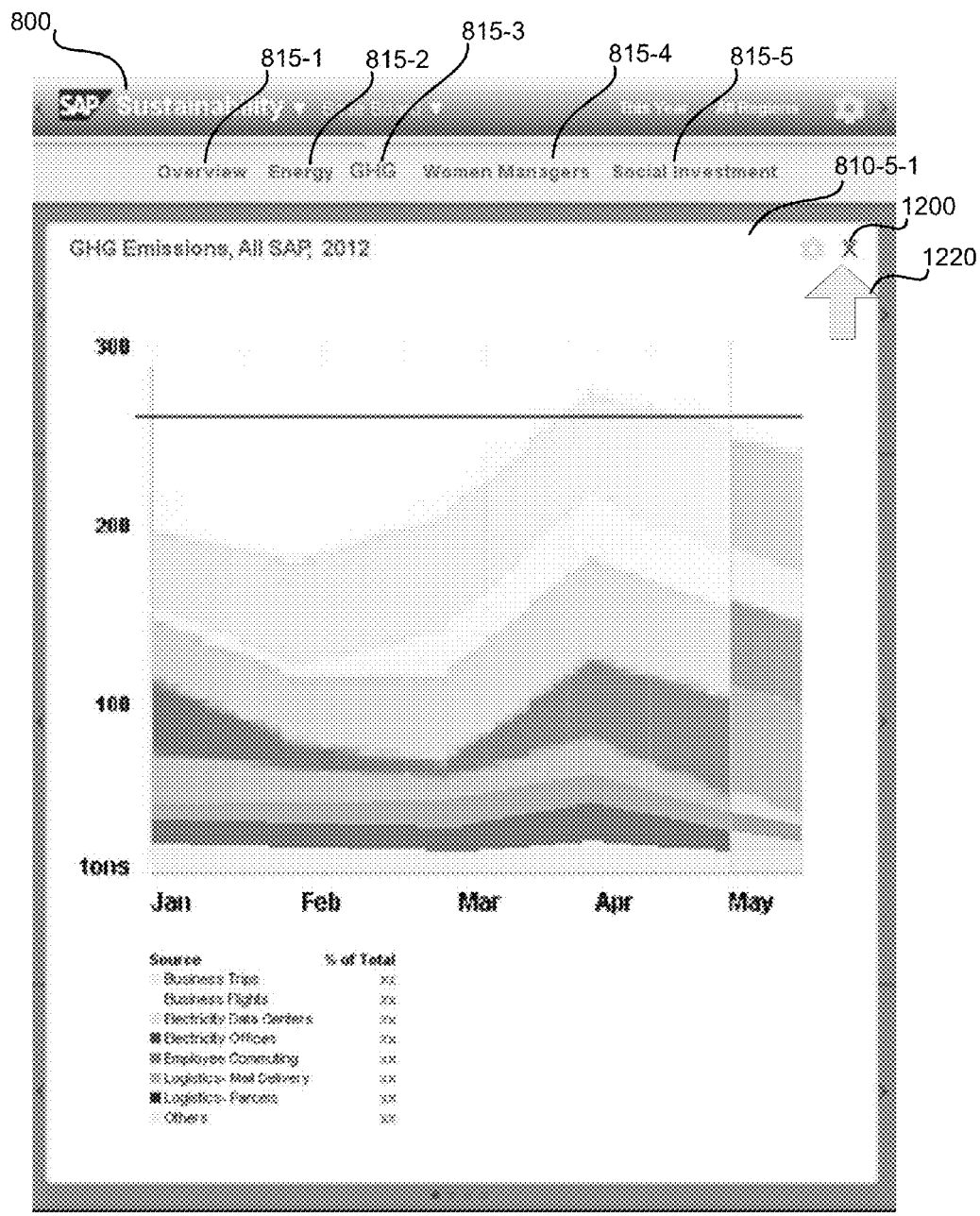

In some embodiments, each one of the visual analytics may also include additional controls that can be employed to drill down into the data underlying visual analytic. For example, as depicted in FIG. 11, one of the single point type visual analytics 810-5 in channel 1013-1 may be selectable by a touch or gesture on or around the visual analytic 810-5. Upon selection of a particular visual analytic, the dashboard manager may enlarge the visual analytic to generate a different or more detailed representation. For example, upon selection of visual analytic 810-5 indicated by arrow 1120, the dashboard manager may generate and display panel 815-3 as illustrated in FIG. 12. In the representation shown in FIG. 12, visual analytic 810-5 has been enlarged to include additional detail in visual analytic 810-5-1. Once a user is done using the detailed visual analytic 810-5-1, the detailed visual analytic may be closed in response to receiving user input through control 1200, as indicated by arrow 1220.

Figure 13:
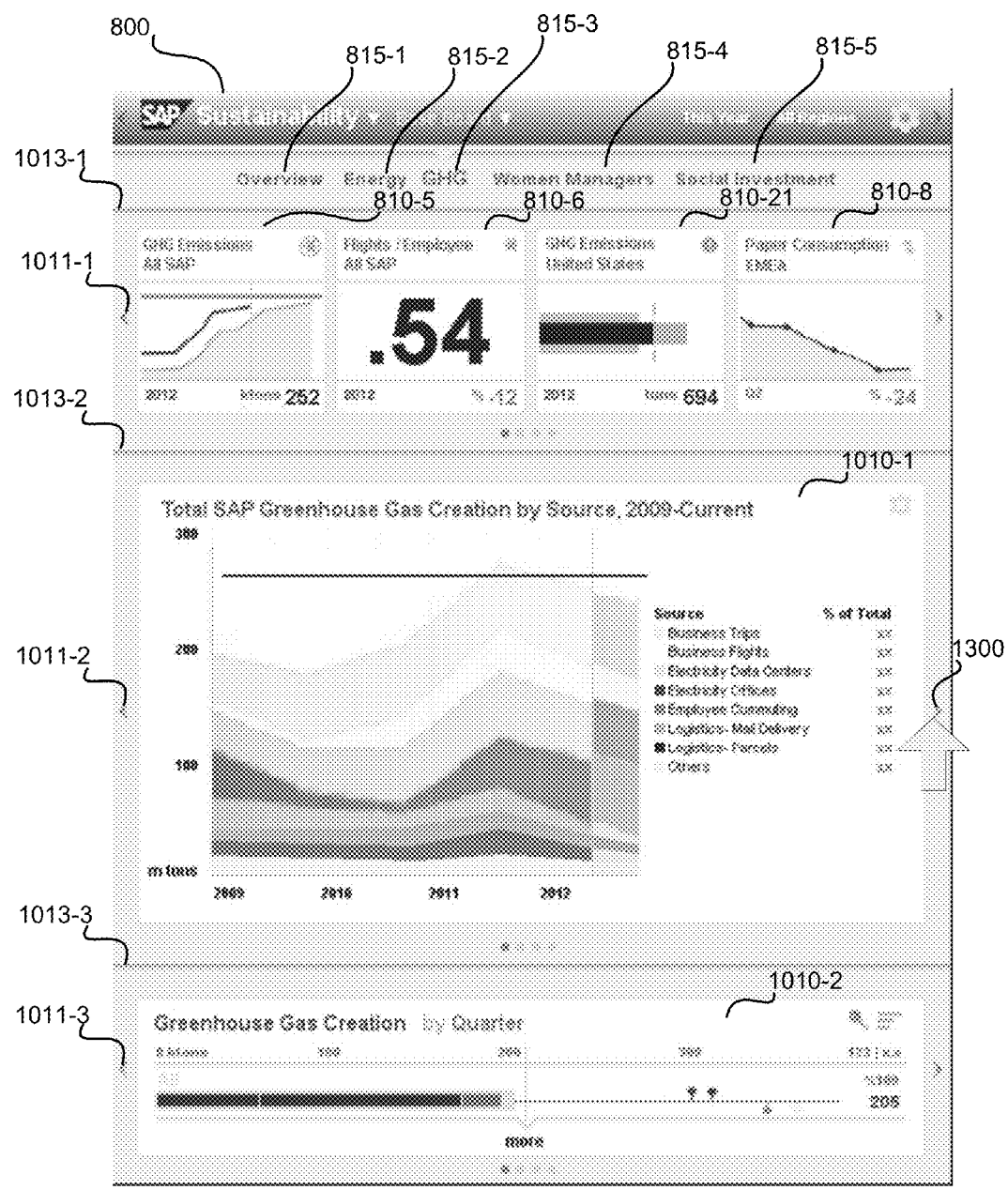
Figure 14:
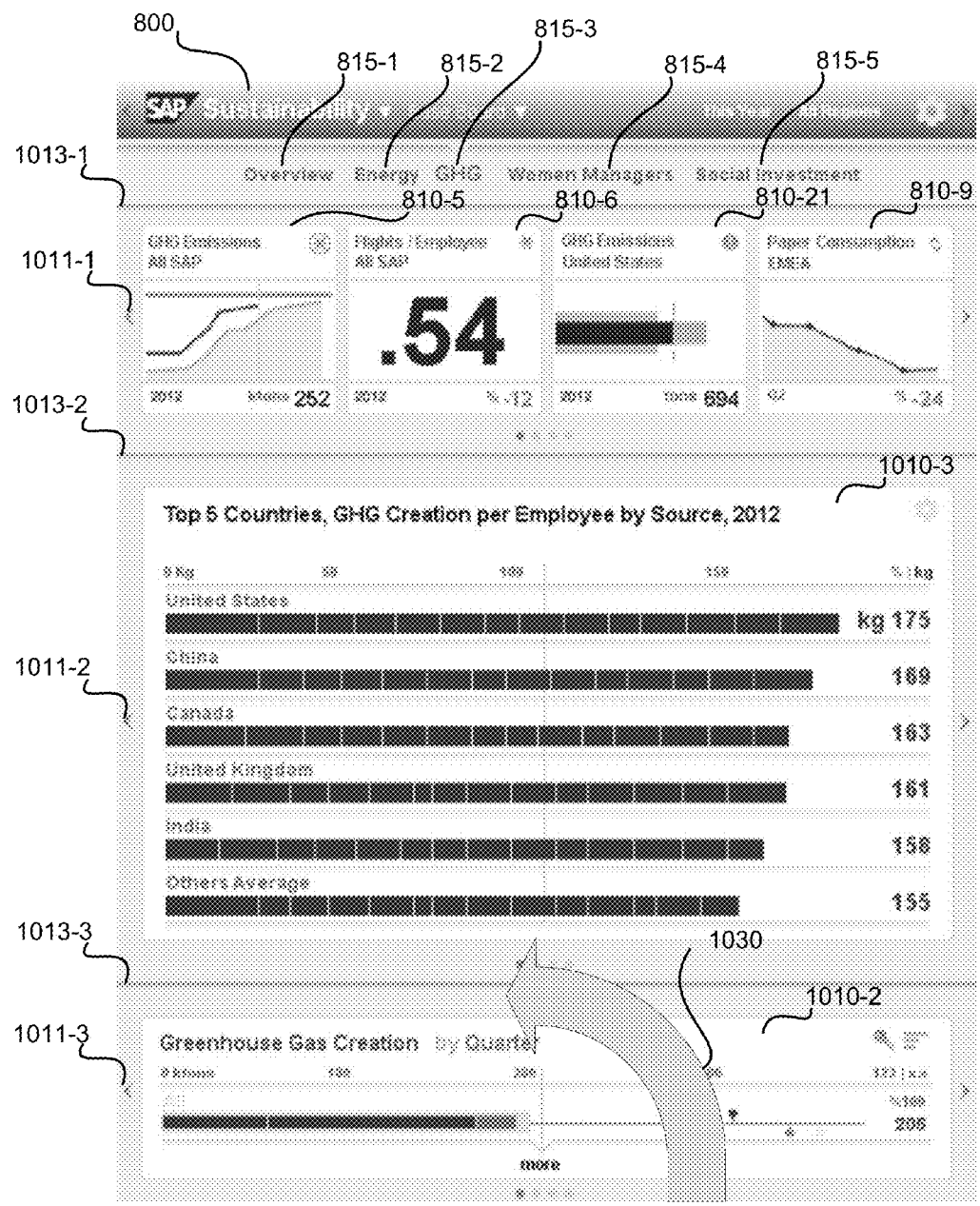

When the detailed version of visual analytic 810-5-1 is closed, the dashboard manager can display the version of the greenhouse gas emissions panel 815-3 as shown in FIG. 13, which may be the same as the version of greenhouse gas emissions panel in 15-3 shown in FIG. 10. In response to user input received through control 1011-2, as indicated by arrow 1300, the dashboard manager can horizontally navigate away from visual analytic 1010-1 to display visual analytic 1010-3 in channel 1013-2, as illustrated in FIG. 14.

Figure 15:
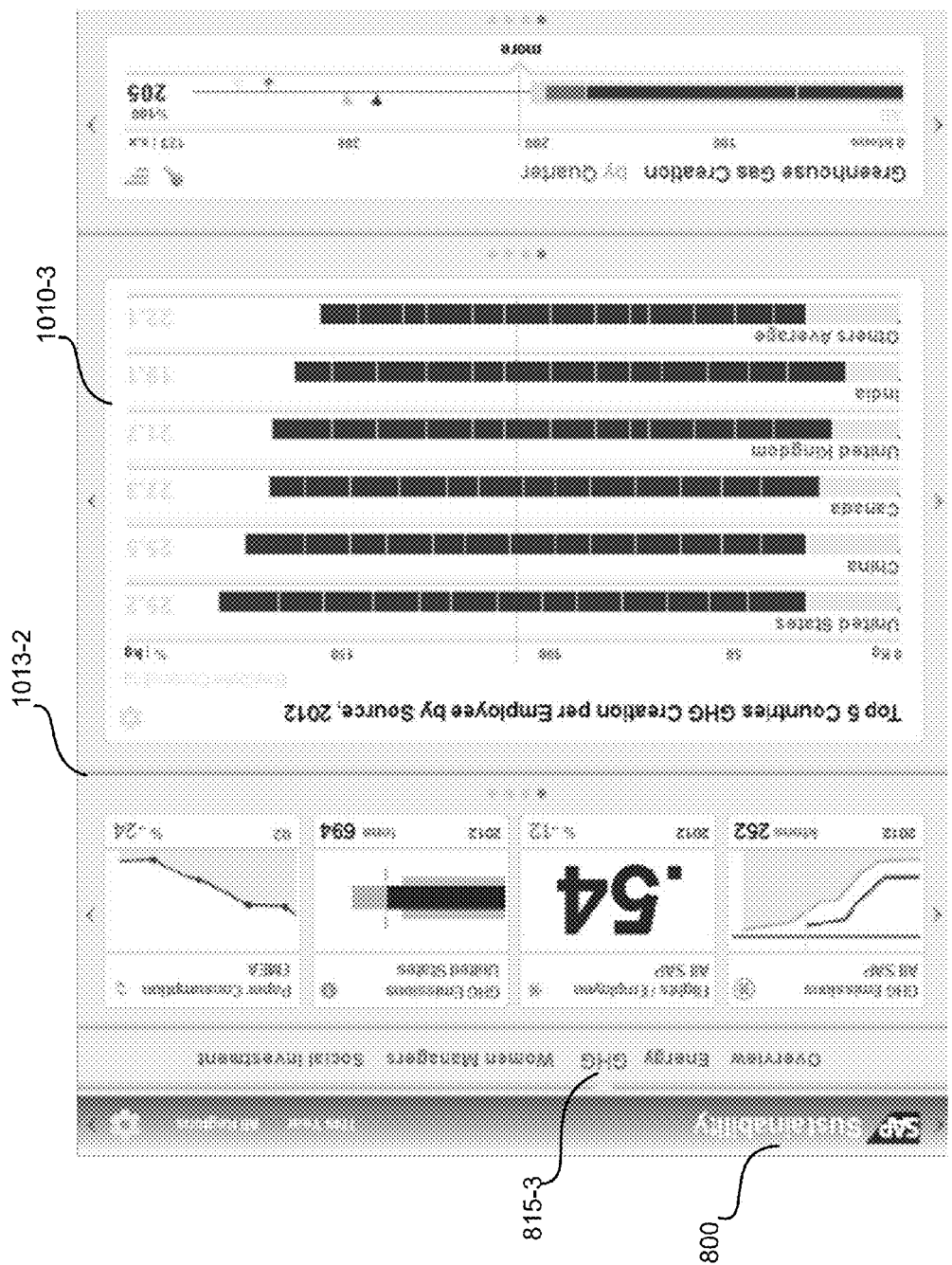
Figure 16:
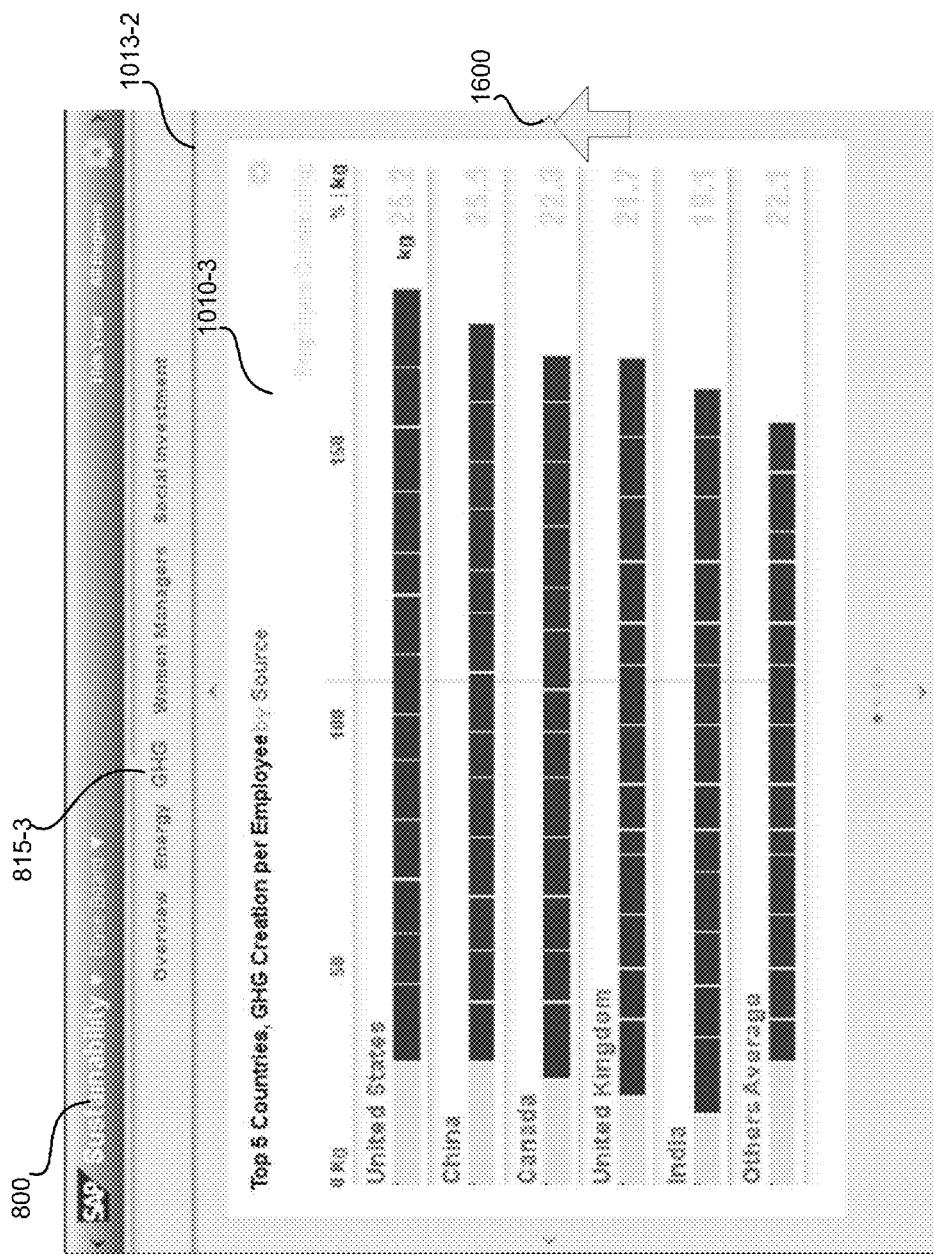

Embodiments in which the dashboard manager is implemented in a portable computing device with an accelerometer or other position or motion sensor, such as a tablet computer or smart phone, the dashboard manager can receive user input in the form of rotation of the device. For example, a rotation in the direction of arrow 1030 can momentarily cause dashboard 800 to be shown on its side, as depicted in FIG. 15. In response to the detection of the rotation of the computing device, the dashboard manager may change the display mode of the dashboard 800 to zoom in on one or more of the visual analytics in one or more of the channels. For example, as shown in FIG. 16, the visual analytic 1010-3 can be enlarged and shown in a landscape mode. The dashboard manager can determine which visual analytic to zoom in on based on a predefined default designation of a channel or visual analytic type or position. In other embodiments, the dashboard can determine to zoom in on the last active visual analytic. For example, the most recently active visual analytic can be determined to be the visual analytic to which a user or the dashboard manager most recently navigated. Accordingly, if a user is scrolling horizontally through one of the channels, then that channel can be considered to be the most recently active channel and the visual analytic in a specific location, e.g., a first position in the channel, can be determined to be the most recently active visual analytic. Accordingly, the visual analytic that was most recently active visual analytic can be enlarged upon rotation of the portable computing device.

Figure 17:
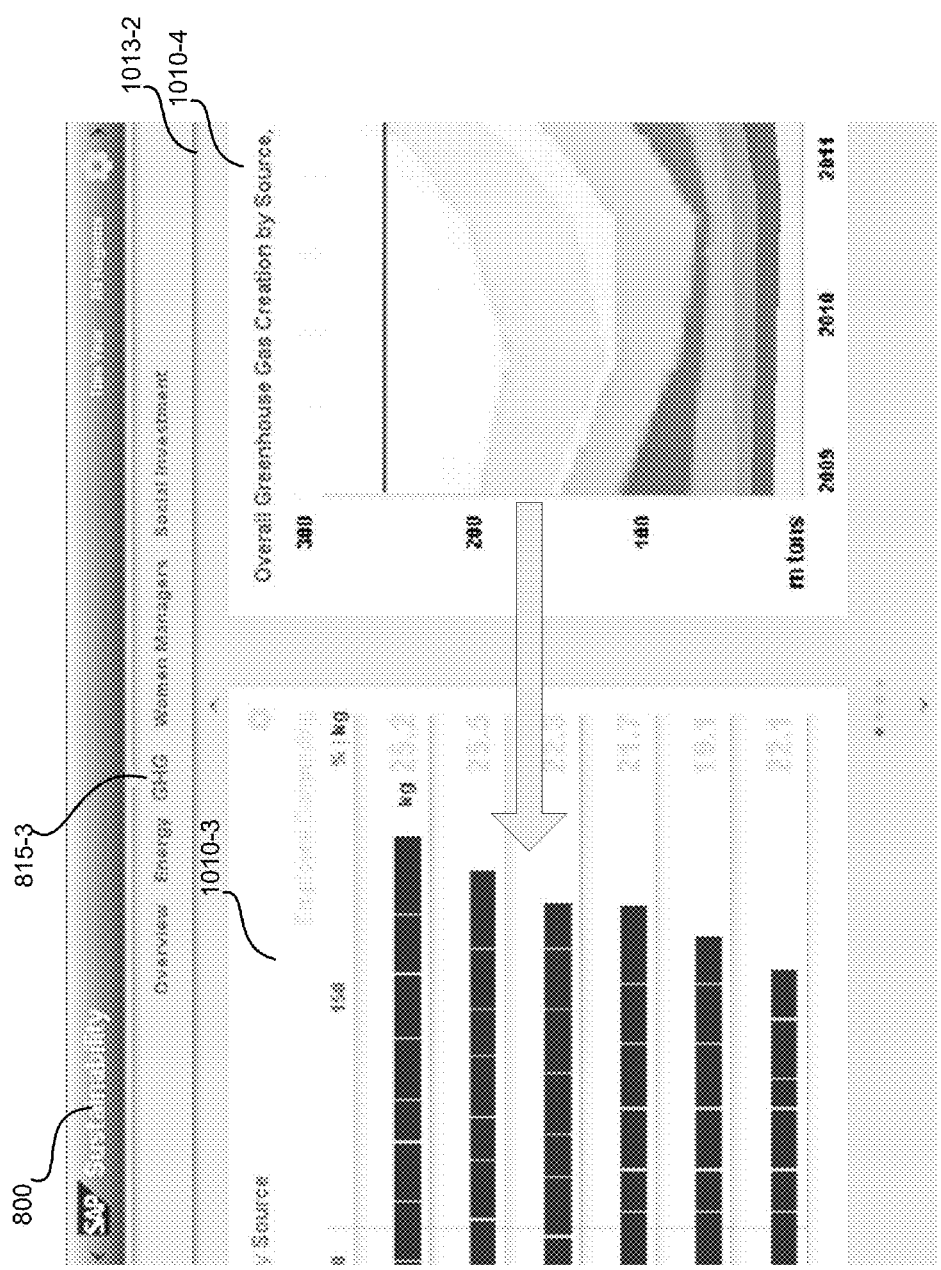
Figure 18:
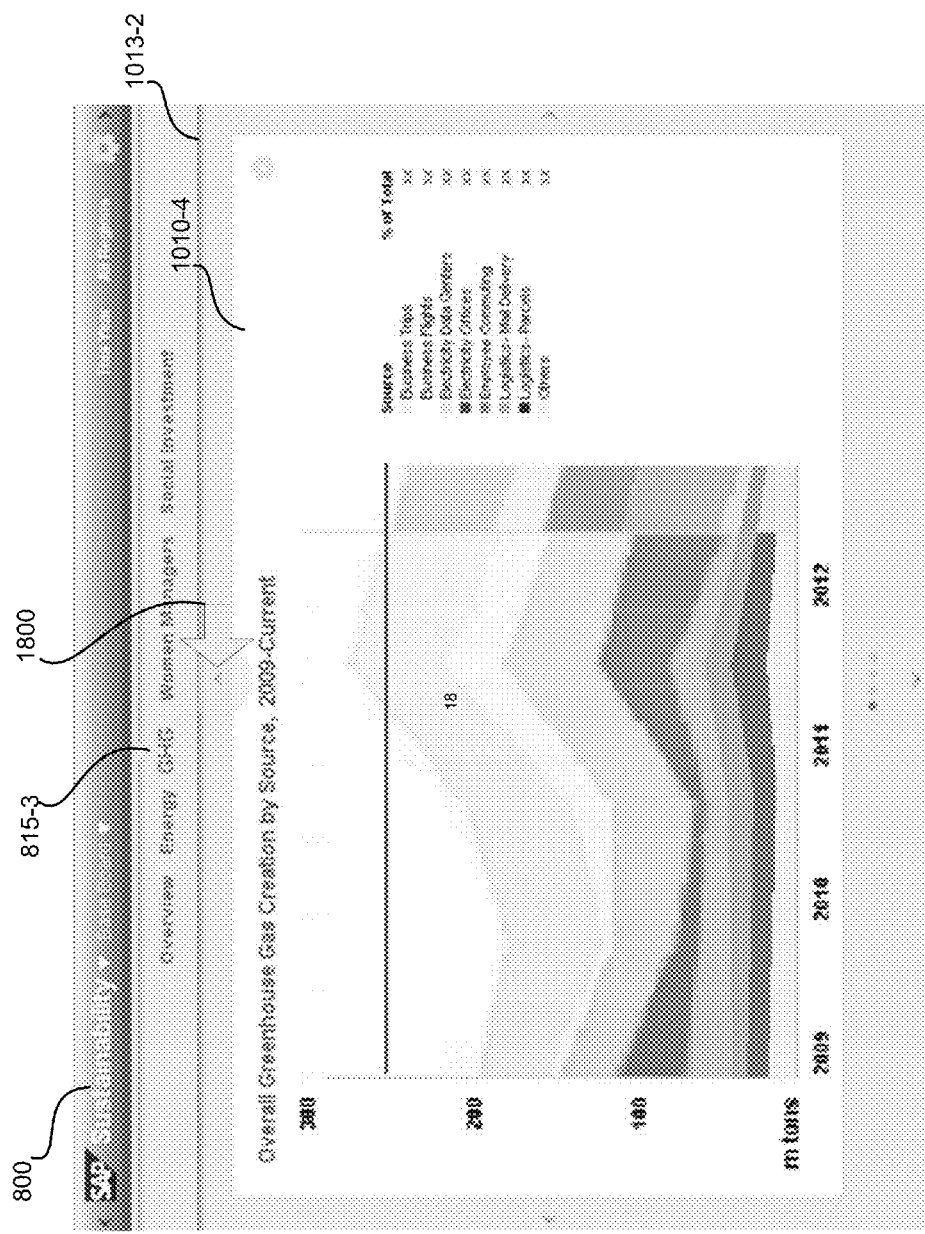
Figure 19:
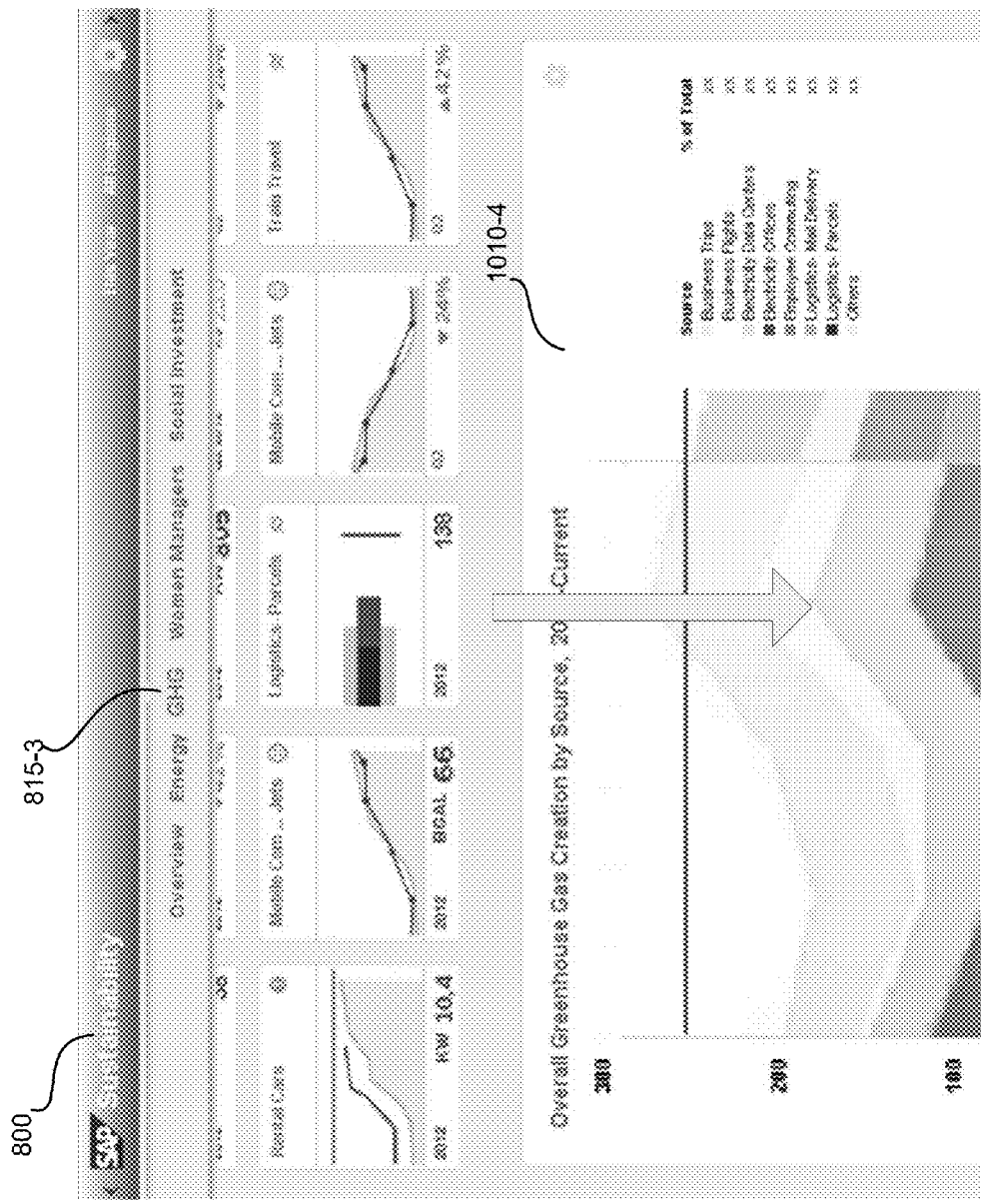
Figure 20:
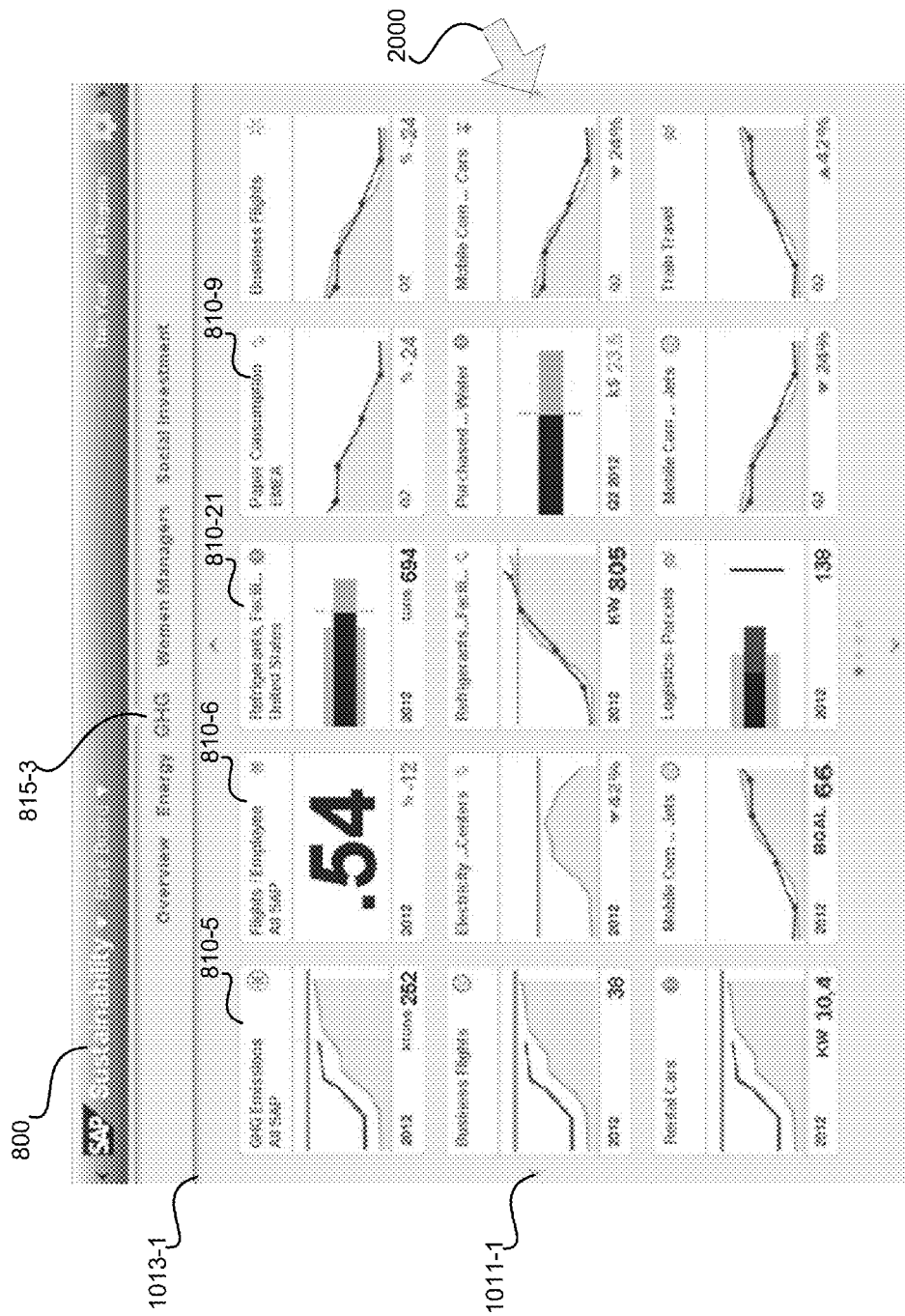
Figure 21:
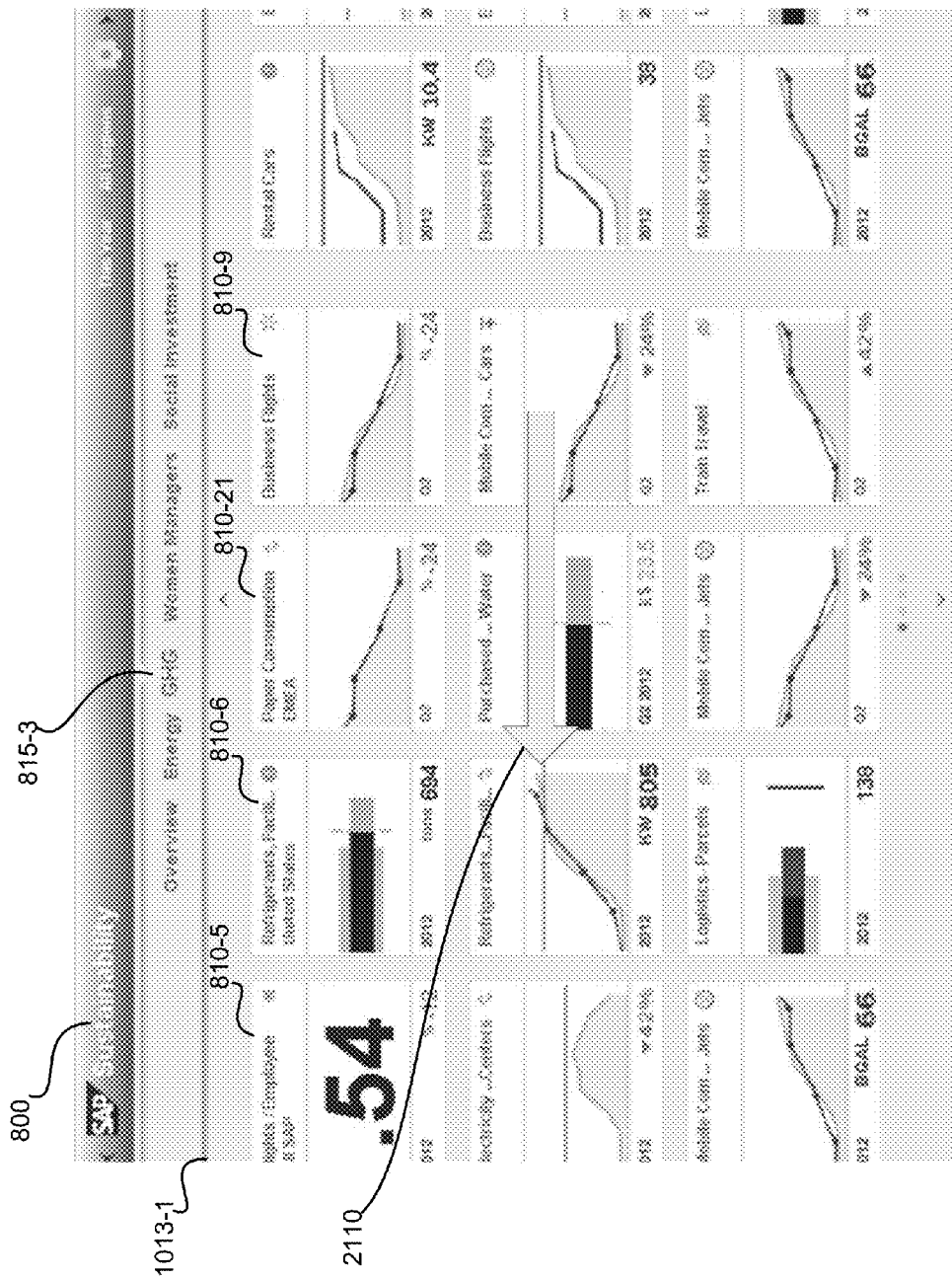
Figure 22:
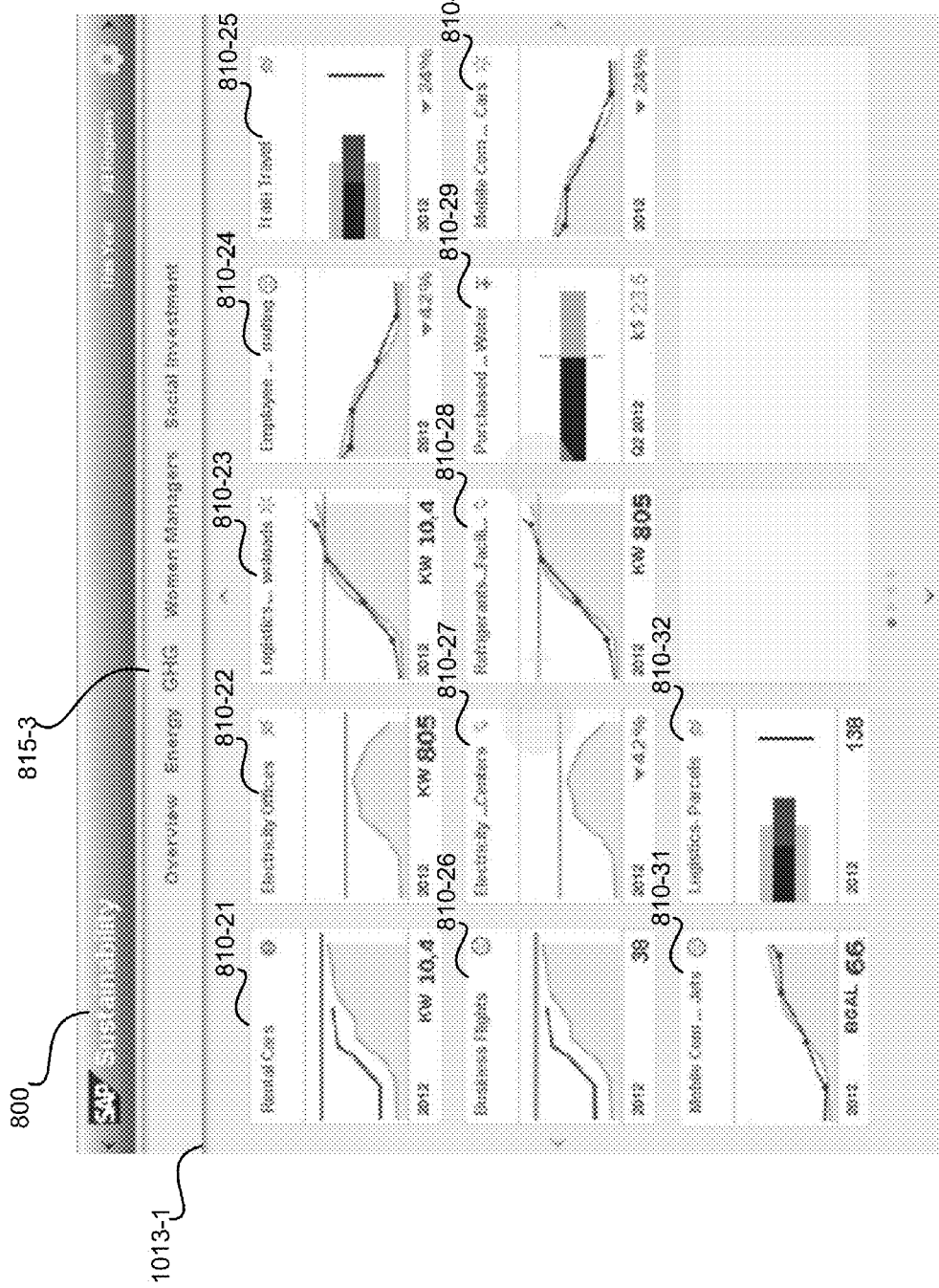

In the horizontal zoomed-in view of FIG. 16, the dashboard manager can receive user input as depicted by arrow 1600 through one of the controls or through a touchscreen gesture to horizontally navigate away from visual analytic 1010-3 to another visual analytic 1010-4 as illustrated in FIG. 17. Once visual analytic 1010-4 is fully displayed in the channel 1013-2, as shown in FIG. 18, the dashboard manager may receive user input 1800 through a control or through a touchscreen gesture to vertically navigate to another channel 1010. For example, as illustrated in FIG. 19, the dashboard manager can, in response to user input, navigate away from channel 1013-2 to show a zoomed in or expanded version of channel 1013-1 shown in FIG. 20. Channel 1013-1 maintains the ability to be horizontally navigated through inputs indicated by arrow 2000 receive your control or through a touchscreen gesture, as illustrated the changed view of visual analytics moving from the right to the left of the display indicated by arrow 2110, in FIG. 21, to show the resulting array of visual analytics 810-21 through 810-32 depicted in FIG. 22.

Figure 23:
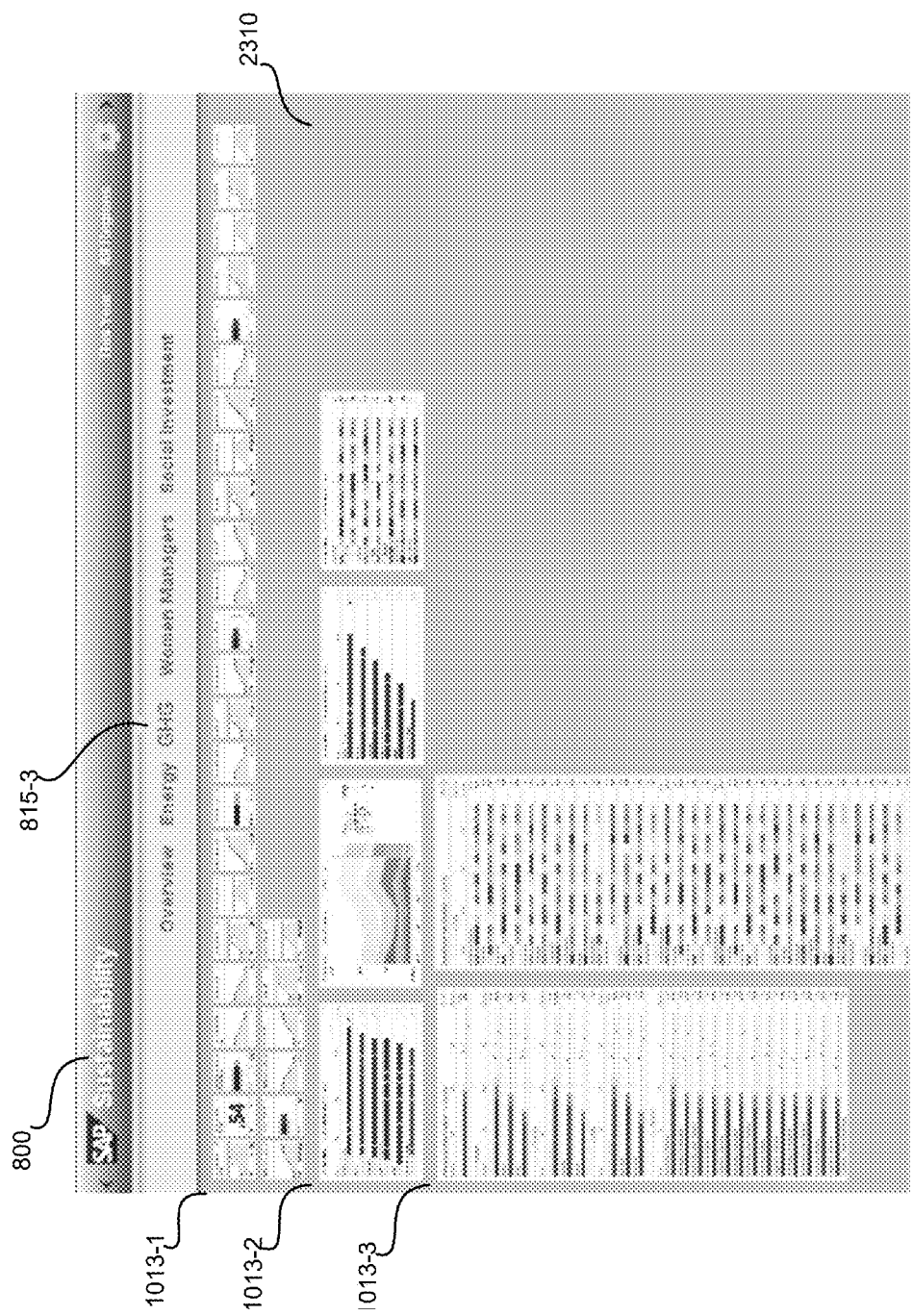

In response to user input, the dashboard manager can zoom out to enter a "flyover mode" to depict channels 813 and the relative position among the various visual analytics 810 contained therein. For example, FIG. 23 illustrates an expanded depiction 2310 of panel 815-3 generated by the dashboard manager in response to user input to zoom out. The user input to zoom out can include activation of an embedded control in dashboard 800, panel 813-3, or through a touchscreen gesture.

Figure 24:
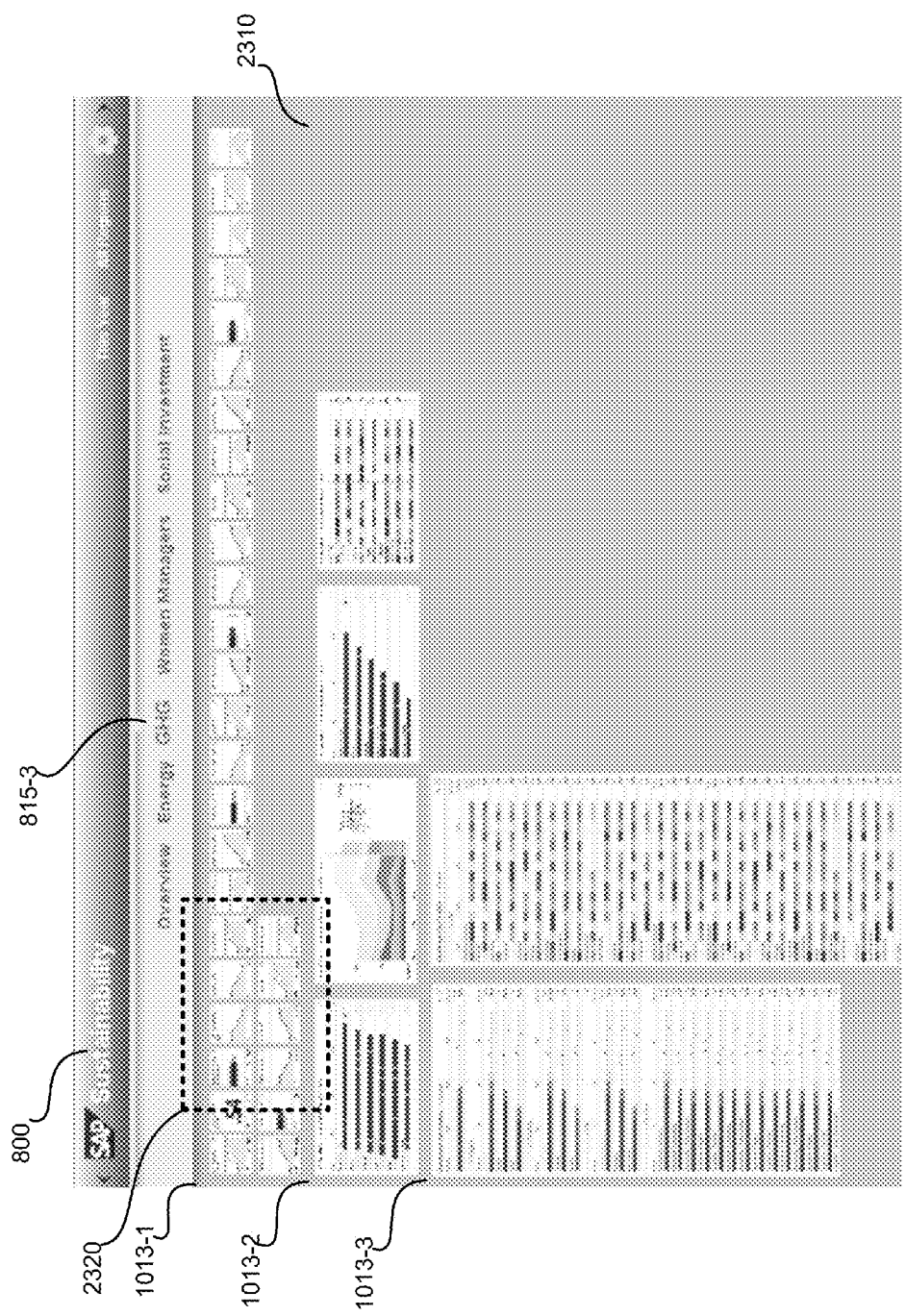
Figure 25:
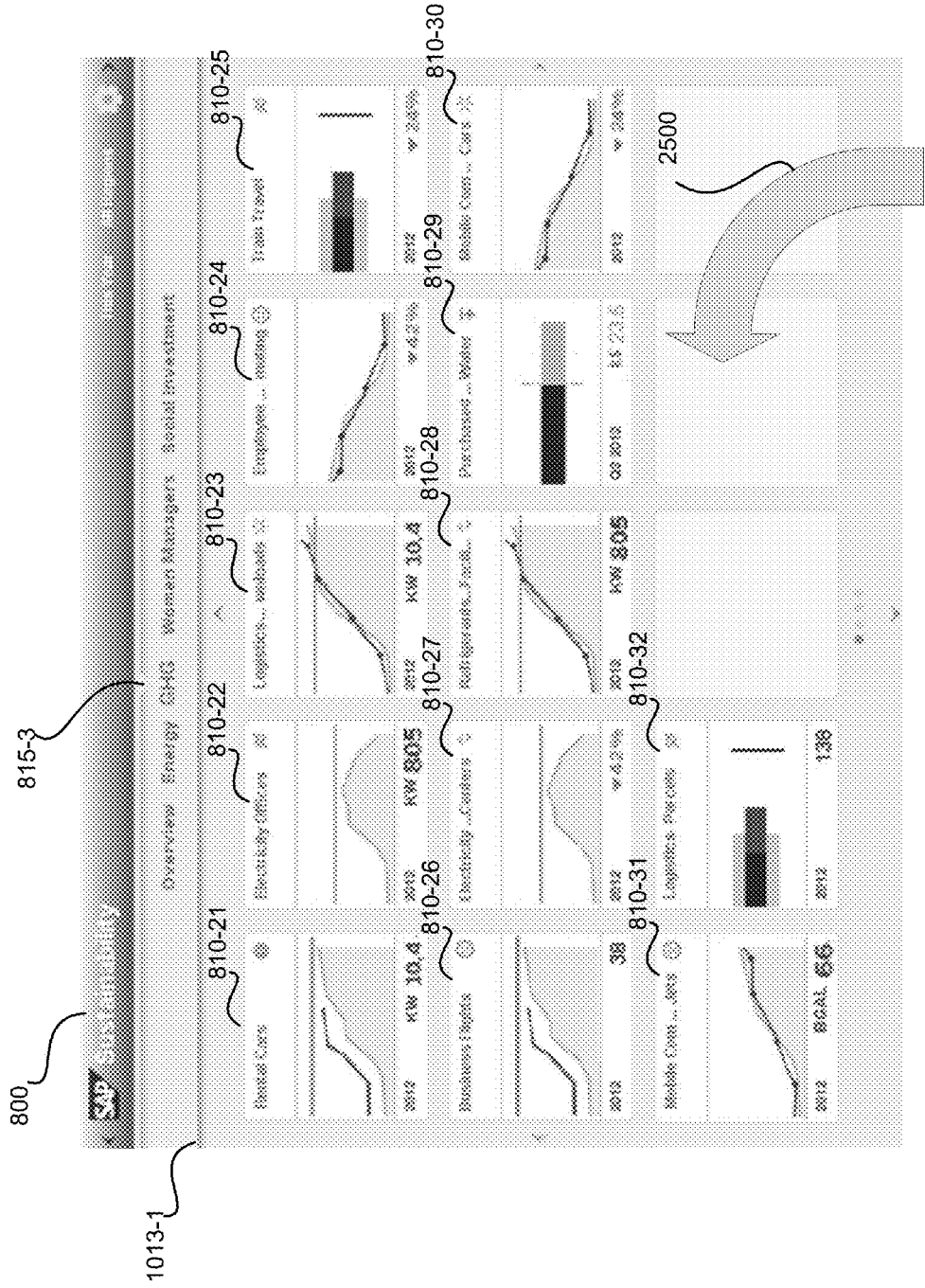

Similarly, the dashboard manager can zoom in on a portion or area of the expanded depiction 2310 to quickly zoom in on a particular visual analytic, channel, or region. For example, as illustrated in FIG. 24, the dashboard manager may receive user input to select the area 2320 that includes a number of visual analytics in channel 813-1. In response the zoom in user input, dashboard manager can zoom in to show the depiction of panel 815-3 illustrated in FIG. 25.

Figure 26:
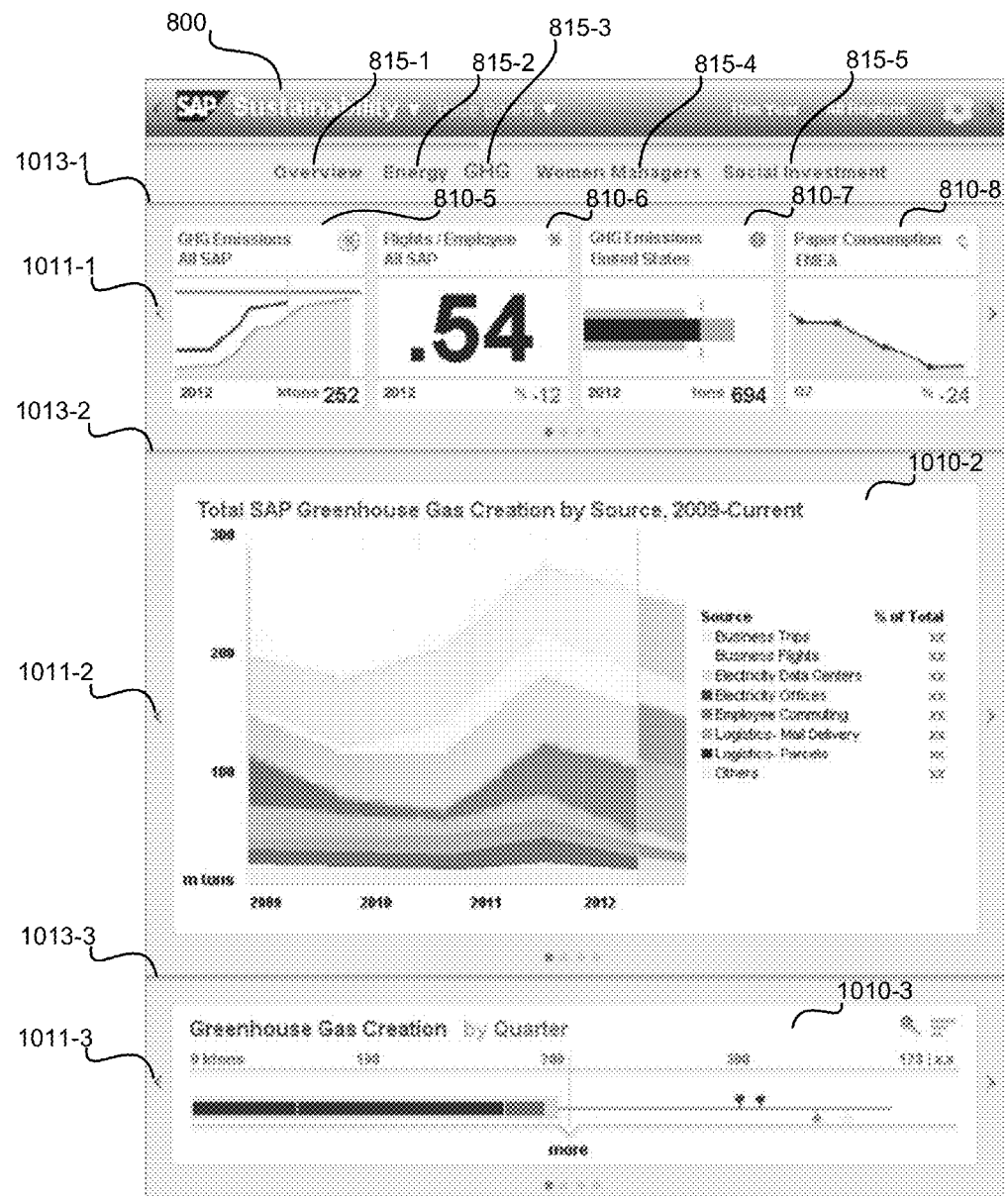

To exit the landscape mode illustrated in FIGS. 16 through 25, the dashboard manager may receive user input in the form of accelerometer data that indicates that the user has returned the portable computing device to a portrait or vertical orientation, as indicated by arrow 2500. In response to user input that indicates return to the portrait or vertical orientation of the computing device, the dashboard manager generated and displayed the default depiction of the panel 815-3 of dashboard 800, as illustrated in FIG. 26. Alternatively the dashboard manager can generate and display the last configuration of dashboard 800 observed prior to entering the landscape mode.

Figure 27:
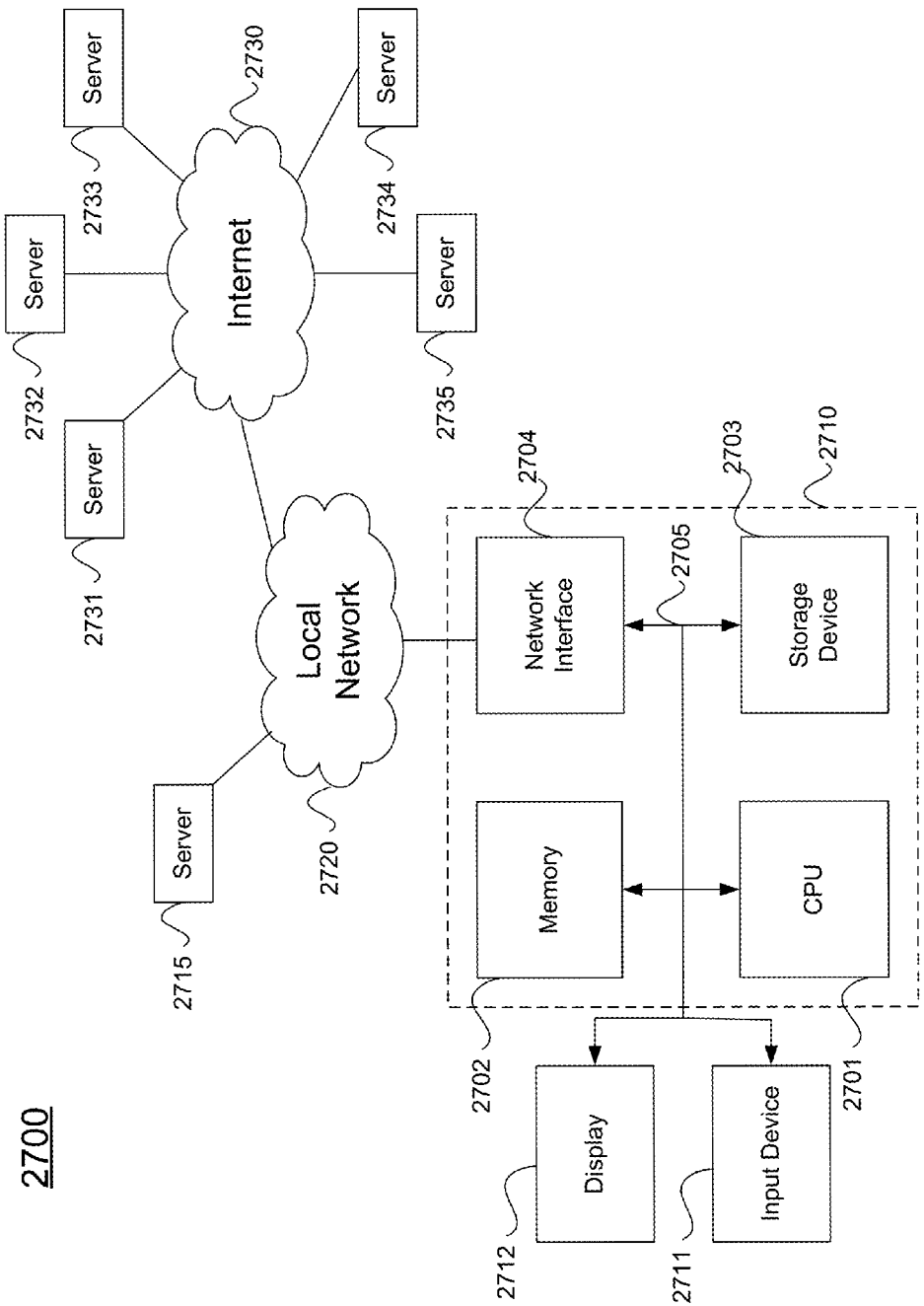
FIG. 27 depicts an example computer system and network that can be used to implement various embodiments of the present disclosure.

FIG. 27 illustrates an example computer system and networks that may be used to implement one embodiment of the present disclosure. Computer system 2710 includes a bus 2705 or other communication mechanism for communicating information, and a processor 2701 coupled with bus 2705 for processing information. Computer system 2710 also includes a memory 2702 coupled to bus 2705 for storing information and instructions to be executed by processor 2701, including instructions for performing the techniques described above. This memory may also be used for storing temporary variables or other intermediate information during execution of instructions to be executed by processor 2701. Possible implementations of this memory may be, but are not limited to, random access memory (RAM), read only memory (ROM), or both. A storage device 2703 is also provided for storing information and instructions. The information instructions can be in the form of computer readable code stored on the storage device, accessible and executable by processor to implement various techniques and methods of the present disclosure. Common forms of storage devices include non-transient, non-volatile computer readable media, for example, a hard drive, a magnetic disk, an optical disk, a CD, a DVD, a flash memory, a USB memory card, or any other medium from which a computer can read.

Computer system 2710 may be coupled via the same or different information bus, such as bus 2705, to a display 2712, such as a cathode ray tube (CRT), touchscreen, or liquid crystal display (LCD), for displaying information. An input device 2711 such as a keyboard and/or mouse is coupled to a bus for communicating information and command selections from the user to processor 2701. The combination of these components allows the user to communicate with the system.

Computer system 2710 also includes a network interface 2704 coupled with bus 2705. Network interface 2704 may provide two-way data communication between computer system 2710 and the local network 2720. The network interface 2704 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 2704 sends and receives electrical, electromagnetic, or optical signals that carry digital data streams representing various types of information.

Computer system 2710 can send and receive information, including messages or other interface actions, through the network interface 2704 to an Intranet or the Internet 2730. In the Internet example, software components or services may reside on multiple different computer systems 2710 or servers 2731 across the network. Software components described above may be implemented on one or more servers. A server 2731 may transmit messages from one component, through Internet 2730, local network 2720, and network interface 2704 to a component or container on computer system 2710, for example. Software components of a composite application may be implemented on the same system as other components, or on a different machine than other software components. This process of sending and receiving information between software components or one or more containers may be applied to communication between computer system 2710 and any of the servers 2731 to 2735 in either direction. It may also be applied to communication between any two servers 2731 to 2735.

Each above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   loading, in a portable computing device, a graphical user interface (GUI) framework, wherein the GUI framework comprises:
      a navigable title section, and
      a plurality of panels corresponding to a plurality of particular purposes, wherein the navigable title section comprises controls for navigating among the plurality of panel, and wherein each of the plurality of panels comprises a plurality of separate horizontally navigable channels;

receiving, in the portable computing device, a plurality of visual analytics;

loading, in the portable computing device, a set of visual analytics selected from the plurality of visual analytics into the plurality of separate horizontally navigable channels of the plurality of panels;

first detecting, in the portable computing device, a request to navigate through a horizontally navigable channel from the plurality of separate horizontally navigable channels belonging to a panel from the plurality of panels;

second detecting, in the portable computing device, a user input through a motion sensor of the portable computing device; and rendering, in the portable computing device and in response to the second detection, a secondary representation of a visual analytic that was loaded into a specified location of the horizontally navigable channel.

2. The method of claim 1 further comprising receiving, in the portable computing device, a dashboard model, wherein the dashboard model defines the set of visual analytics and an arrangement of the set of visual analytics, the arrangement being compatible with the GUI framework, and wherein loading the set of visual analytics comprises loading the set of visual analytics into the plurality of panels according to the arrangement.

3. The method of claim 1 further comprising, generating, in the portable computing device, a main panel comprising a subset of the set of visual analytics, wherein each of the subset represents a particular panel in the plurality of panels and comprises controls to navigate to the particular panel.

4. The method of claim 3 further comprising, receiving, in the portable computing device, user input through one of the subset, and in response thereto, rendering the particular panel.

5. A non-transitory computer readable medium comprising instructions that when executed by a computer processor cause the computer processor to be configured for:

loading a graphical user interface (GUI) framework, wherein the GUI framework comprises:

a navigable title section, and a plurality of panels corresponding to a plurality of particular purposes, wherein the navigable title section comprises controls for navigating among the plurality of panels, and wherein each of the plurality of panels comprises a plurality of separate horizontally navigable channels;

receiving a plurality of visual analytics; and loading a set of visual analytics selected from the plurality of visual analytics into the plurality of separate horizontally navigable channels of the plurality of panels;

first detecting a request to navigate through a horizontally navigable channel from the plurality of separate horizontally navigable channels belonging to a panel from the plurality of panels;

second detecting a user input through a motion sensor of the portable computing device; and rendering, in response to the second detection, a secondary representation of a visual analytic that was loaded into a specified location of the horizontally navigable channel.

6. The non-transitory computer readable medium of claim 5 wherein the instructions further cause the computer processor to be configured for receiving a dashboard model, wherein the dashboard model defines the set of visual analytics and an arrangement of the set of visual analytics, the arrangement being compatible with the GUI framework, and wherein loading the set of visual analytics comprises loading the set of visual analytics into the plurality of panels according to the arrangement.

7. The non-transitory computer readable medium of claim 5 wherein the instructions further cause the computer processor to be configured for receiving a user input through the controls of the navigable title section, and, in response thereto, rendering at least one panel in the plurality of panels.

8. The non-transitory computer readable medium of claim 7 wherein rendering at least one panel in the plurality of panels comprises first rendering a first panel in the plurality of panels and then rendering a second panel in the plurality of panels.

9. The non-transitory computer readable medium of claim 5 wherein the instructions further cause the computer processor to be configured for generating a main panel comprising a subset of the set of visual analytics, wherein each of the subset represents a particular panel in the plurality of panels and comprises controls to navigate to the particular panel.

10. The non-transitory computer readable medium of claim 9 wherein the instructions further cause the computer processor to be configured for receiving user input through controls of one of the subset, and in response thereto, rendering the particular panel.

11. A portable computing device comprising:

a processor;

a display device coupled to the processor;

a motion sensor coupled to the processor;

a non-transitory computer readable medium comprising instructions that when executed by the processor cause the computer processor to be configured to:

load a graphical user interface (GUI) framework, wherein the GUI framework comprises:

a navigable title section, and a plurality of panels corresponding to a plurality of particular purposes, wherein the navigable title section comprises controls for navigating among the plurality of panels to display one panel from the plurality of panels at a time, and wherein each of the plurality of panels comprises a plurality of separate horizontally navigable channels;

receive a plurality of visual analytics; and load a set of visual analytics selected from the plurality of visual analytics into the plurality of separate horizontally navigable channels of the plurality of panels;

first detecting a request to navigate through a horizontally navigable channel from the plurality of separate horizontally navigable channels belonging to a panel from the plurality of panels;

second detecting a user input through a motion sensor of the portable computing device; and rendering, in response to the second detection, a secondary representation of a visual analytic that was loaded into a specified location of the horizontally navigable channel.

12. The portable computing device of claim 11 wherein the non-transitory computer readable medium further comprises instructions that cause the computer processor to be configured to receive a dashboard model, wherein the dashboard model defines the set of visual analytics and an arrangement of the set of visual analytics, the arrangement being compatible with the GUI framework, and wherein the instructions further cause the processor to be configured to load the set of visual analytics into the plurality of panels according to the arrangement.

13. The portable computing device of claim 11 wherein the instructions further cause the processor to be configured to receive a user input through the controls of the navigable title section, and, in response to the user input, render in the display device at least one of the plurality of panels.

14. The portable computing device of claim 13 wherein the instructions that cause the processor to be configured to render at least one of the plurality of panels further comprises instructions that cause the processor to be configured to first render a first panel in the plurality of panels and then render a second panel in the plurality of panels.

15. The portable computing device of claim 11 wherein the instructions further cause the processor to be configured to generate a main panel comprising a subset of the set of visual analytics, wherein each of the subset represents a particular panel in the plurality of panels and comprises controls to navigate to the particular panel.

16. The method of claim 1,
wherein the second representation is a zoomed in view of the visual analytic.

17. The non-transitory computer readable medium of claim 5 wherein the second representation is a zoomed in view of the visual analytic.

18. The portable computing device of claim 11 wherein the second representation is a zoomed in view of the visual analytic.

* * * * *